United States Patent
Bernath et al.

(10) Patent No.: US 6,553,040 B2
(45) Date of Patent: Apr. 22, 2003

(54) METHOD AND APPARATUS FOR UPSTREAM BURST TRANSMISSION SYNCHRONIZATION IN CABLE MODEMS

(75) Inventors: Brett Alan Bernath, San Diego, CA (US); John Milford Brooks, San Diego, CA (US); Manoj Mehta, Laguna Hills, CA (US); Yoav Pesach Goldenberg, Kiryat Byalic (IL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/908,759

(22) Filed: Jul. 19, 2001

(65) Prior Publication Data

US 2001/0043622 A1 Nov. 22, 2001

Related U.S. Application Data

(62) Division of application No. 09/415,612, filed on Oct. 9, 1999.

(51) Int. Cl.[7] .............................. H04B 7/216; H04J 3/06; H04L 5/16
(52) U.S. Cl. ........................ 370/509; 370/335; 370/342; 370/516; 375/219; 375/327
(58) Field of Search .................................. 370/342, 503, 370/509, 508, 510, 512, 335, 314, 449, 461; 348/10–13, 521, 536, 537; 375/219, 376, 375

(56) References Cited

U.S. PATENT DOCUMENTS

| | | | | |
|---|---|---|---|---|
| 4,454,538 A | * | 6/1984 | Toriumi | 725/131 |
| 4,553,161 A | * | 11/1985 | Citta | 725/131 |
| 5,517,502 A | * | 5/1996 | Bestler et al. | 370/449 |
| 5,546,119 A | | 8/1996 | Bestler et al. | 348/10 |
| 5,570,347 A | * | 10/1996 | Bestler et al. | 370/461 |
| 5,745,837 A | | 4/1998 | Fuhrmann | 455/5.1 |
| 5,767,746 A | * | 6/1998 | Dieterich | 331/17 |
| 5,790,806 A | | 8/1998 | Koperda | 395/200 |
| 5,883,901 A | * | 3/1999 | Chiu et al. | 370/508 |
| 5,898,744 A | * | 4/1999 | Kimbrow et al. | 375/376 |
| 5,995,483 A | * | 11/1999 | Marchok et al. | 370/207 |
| 6,055,242 A | * | 4/2000 | Doshi et al. | 370/458 |
| 6,177,959 B1 | * | 1/2001 | Bril | 348/521 |
| 6,243,369 B1 | * | 6/2001 | Grimwood et al. | 370/335 |
| 6,260,193 B1 | * | 7/2001 | Chang et al. | 725/121 |

OTHER PUBLICATIONS

Data–Over–Cable Service Interface Specifications, Cable Modem to Customer Premise Equipment Interface Specification SP–CMCI–I03–991115, 1999, pp. i–58.

(List continued on next page.)

Primary Examiner—Huy D. Vu
Assistant Examiner—M. Phan
(74) Attorney, Agent, or Firm—Foley & Lardner

(57) ABSTRACT

A system for synchronizing the upstream burst transmission in a cable system to a time specified by the cable head end is disclosed. The system includes a free running counter within a cable modem (CM) or network interface unit (NIU), along with logic to capture the value of this free running counter at the time a frame of MPEG-2 SYNC data arrives, to create a time tag stored in memory. A computer within the cable modem or network interface unit has access to the time tags in memory and the contents of a time synchronization message from the head end, also stored in memory. The computer contains a program to calculate the value of the local counter that corresponds to a time to transmit commanded by the cable system head end. The system includes logic within the CM or NIU to initiate an upstream burst transmission when the value of the local counter becomes equal to a calculated value, thus causing the cable modem to initiate its upstream burst transmission precisely at the time commanded by the head end.

17 Claims, 14 Drawing Sheets

OTHER PUBLICATIONS

Data–Over–Cable Service Interface Specifications, Cable Modem Termination System–Network Side Interface Specification SP–CMTS–NSII01–960702, pp. ii–13.

European Telecommunication Standard ETS 300 800, European Broadcasting Union, Digital Video Broadcasting (DVB); DVB interaction channel for Cable TV distribution systems, Apr. 16, 1999.

Robert Wolters, et al., *A Novel ATM Based Data Transport Systems for Hybrid Fiber Coax CATV Networks*, IEEE ATM Workshop. Proceedings, XX,XX, May 25, 1997, pp. 494–502, XP000924887 section 4 "Time Slot Synchronization" abstract.

PCT International Search Report as issued in International Application No. PCT/US00/28010, mailing date:Apr. 4, 2001.

* cited by examiner

METHOD AND APPARATUS FOR UPSTREAM BURST TRANSMISSION SYNCHRONIZATION IN CABLE MODEMS

This application is a divisional of U.S. patent application Ser. No. 09/415,612, filed Oct. 9, 1999, entitled "Method and Apparatus for Upstream Burst Transmissions Synchronization in Cable Modems." Embodiments of the present invention are related to U.S. patent application Ser. No. 09/909,044, filed Jul. 19, 2001, entitled "Method and Apparatus for Upstream Burst Transmission Synchronization in Cable Modems." The contents of those applications are incorporated by reference herein.

BACKGROUND OF THE INVENTION

1. Field of the Invention

The invention relates generally to methods and apparatus for synchronizing data transmission in computer networks and, in particular embodiments, to methods and apparatuses for synchronizing upstream network transmission in cable modems.

2. Description of Related Art

Data networks have different forms to serve different purposes. An example of a simple network is a network in an office that allows several computers to use one printer. Such a network is commonly known as a Local Area Network (LAN). Other networks may be more complex. The Internet is an example of a more complex network, in which many smaller networks from all over the world may be interconnected. The Internet allows worldwide transmission of many types of data, including text files, graphics, audio, and video data. A network that extends over a large geographical area is commonly known as a Wide Area Network (WAN).

WANs have commonly used the telephone system to transmit data over long distances. The telephone system is a convenient data transmission media because it has an established infrastructure which can reliably transmit data worldwide. A major drawback to data transmission via the telephone network, however, is the limited rate at which it can transmit data (its low bandwidth).

For users requiring higher bandwidth, sophisticated but expensive WAN systems have been built. For example, large businesses have utilized satellites orbiting the earth and microwave linked ground stations for the transmission of data. For the general user, however, the telephone system remains a prevalent choice as an acceptable tradeoff of cost and performance. In other words, the general user has accepted low bandwidth because the cost of obtaining greater bandwidth has been high.

Recently, cable television networks have become available. A typical cable TV system can carry many television stations, which are the equivalent of a large amount of data (high bandwidth), simultaneously. Because of the increasing availability of cable television infrastructure, using television cables as the medium for computer data networks has the potential for giving users high bandwidth at a reasonable cost. A cable TV system, however, requires several enhancements in order to function as a data network.

In its classic form, a cable TV system carries information in only one direction, from the cable system head end, to the individual user. The user's interface to the system generally comprises a receiver, for example, a television or a stereo. The head end transmits television or stereo channels simultaneously. In general the user has no influence on what is transmitted and can only choose among the channels the head end is transmitting.

In contrast, a data network must carry data from the head end to the user (the downstream path) and from the user to the head end (the upstream path). The individual user requires equipment, such as a cable modem, that can both receive from the head end and transmit to it. A cable data network must be able to handle many individual users simultaneously, each of whom have control over what they receive and transmit.

In order for a cable TV network to operate as a data network, it requires a head end capable of both transmitting and receiving data as well as a user end equipped with the capability of both receiving and transmitting data through the use of equipment such as a Cable Modem (CM). To assure that each user receives the data they require, a network protocol must be implemented to allow independent users of the network to utilize the shared head end and the distribution network without interference from or receiving the data of other users.

The network protocol places requirements on both the head end and the user end. Generally, the head end serves as the network controller, and the user's cable modem must be able to respond to commands from the head end. In order to support a number of independent users, the network protocol divides the system's resources using two basic methods.

In a cable TV system the head end can transmit several TV channels simultaneously by placing them in different channels in the radio frequency (RF) spectrum. Similarly the network protocol divides the cable network's bandwidth into frequency channels. Each user's cable modem then can be tuned to receive and transmit on one or more of the channels. Generally, in a cable data network, the downstream transmissions are segregated from upstream transmissions by placing them on different RF channels. Such a method is termed Frequency Division Multiple Access (FDMA).

In order to accommodate a number of users, RF channels can be further divided into time slots and each user allotted a timeslot to transmit and receive. This method is commonly known as Time Division Multiple Access (TDMA).

The time slots for the downstream messages are determined by the head end network controller. The reception of data by users is determined by an addressing scheme. The head end transmits a unique address for each cable modem along with the data for that user; the individual modem is configured to accept only the data intended for it.

Allocating time slots for upstream messages generated by users is complicated by the fact that the upstream messages are initiated by independent units. In general, two types of schemes have been developed to control transmissions by the users: arbitration methods and allocation by the controller.

In a common arbitration system, the user's modem initiates transmissions. The system includes a method for detecting collisions between user messages; i.e., more than one user attempting to transmit an upstream message at the same time. When a collision is detected the users must then retransmit their messages, usually adjusting the times at which they retransmit in a attempt to reduce the chances of another collision with messages from the same unit. This method has a drawback in that bandwidth is wasted when the messages that collided are retransmitted. As the channel becomes more crowded, the number of collisions tend to increase.

A method of utilization of the channel is to have the system controller assign a time interval for each user's modem transmission. To implement such a method, the user's transmission must be synchronized so as not to collide with each other. A common way to provide synchronization is to assign transmission time slots to each user. Each user can then transmit in a time assigned to them and collisions are avoided. The more precisely the user modems transmit at their assigned time, the more closely spaced the controller can schedule messages, and the greater the capacity of the network. Therefore, precise scheduling of user modem transmissions is desirable.

SUMMARY OF THE DISCLOSURE

Precise synchronization between elements widely separated in space is not a trivial matter. Compensation for the skewing caused by the finite time required for the signals to travel time between elements must be added if correct synchronization is to be achieved. In addition, transmission of data over a cable may be accomplished by several different standards. One such standard is the MCNS or Multimedia Cable Network System standard, which has been promulgated primarily in North America by DOCSIS (the Data Over Cable System Interface Specification) which has become a de facto standard for compatible cable modems in North America. Multiple other standards have been promulgated; for example, the Digital Video Broadcasting (DVB) standard which is the standard produced by the European Broadcast Union (EBU) under the auspices of the European Telecommunications Standards Institute (ETSI). A system similar to the DVB system has also been proposed by DAVIC (Digital Audio Video Council). To address the synchronization problem MCNS systems may be implemented with a local clock in each Cable Modem, which periodically needs to be synchronized to a master clock within the cable system head end. DVB systems synchronize the local clock in the NIU (DVB terminology for Cable Modem) to the start of transmit marker which comprises a 3 millisecond upstream transmission period, instead of to a master clock. The synchronization of cable modems for the purpose of data transmission has two aspects: an initial offset by which the master clock in the cable system head end and the local time clock in each element (e.g. CM or NIU) differ and the rate at which the two clocks increment time. Typically the clock at the head end of a cable system is highly accurate, while the local clocks within each remote element are somewhat less accurate.

To control the transmission of messages MCNS systems generally synchronize local clocks in the user modem to a system time kept by a master clock within the Cable Modem Termination System (CMTS) at the head end. The CMTS can then command a user's modem to transmit at a time measured by the system time. Synchronization of clocks in the user modems can be accomplished in two stages. First, during user modem initialization, the delays between transmission of a message by the user modem and its reception at the head end are measured and this measurement is transmitted to the user modem and stored in the user modem. This is typically referred to as the Ranging Process. Second, at irregular intervals, the head end transmits synchronization messages to the user modems. This may be referred to as the Update Process. The synchronization messages contain the value of the system time at which the message was sent. The user's modem.must accurately measure the times these messages arrive and use that information to synchronize their local clocks to the system time. Because the rate at which the local clock and master clock increment time may differ, even a perfect synchronization cannot be maintained over time and periodic adjustments are necessary.

In the DVB system the Ranging Process stage described above is similar to the MCNS but the Update Process is somewhat different. The terminology within the DVB system is also different than the MCNS system. The CMTS is referred to as the INA or Interactive Network Adapter. The cable modem from the MCNS system is referred to as the NIU or network interface unit in the DVB system. While the functions of these differently named components are similar, the methodology for cable modem transmission and reception is somewhat different. In the DVB system there are two recommended methods for transmitting downstream data and signals as opposed to the single method within the MCNS system. The two different methods of transmitting data and signals in a DVB system are referred to as the IB or In Band method and the OOB or Out of Band method. In the Out of Band case, synchronization information and 1-millisecond and 3-millisecond periods are derived from the time when specified bits of the bitstream are transmitted by the INA. The In Band case is similar to the MCNS system, but the synchronization message does not contain the value of the system time. Instead it points to the boundary of a 3 millisecond period, and will be primarily dealt with as an implementation which may contain embodiments of the invention. This will not preclude embodiments of the invention from being used in the OOB case, it merely means that the In Band case is more complex and more illustrative of aspects of the invention. Many other embodiments in various systems are possible and the MCNS and DVB examples included here are chosen as those most likely to be familiar to those skilled in the art and hence the most illustrative. In the DVB In Band case, a Media Access Control or MAC control message is transmitted to the NIU. Within the MAC control message (if it is designated as an active SYNC message) is a 10 bit upstream slot position register (USPR) that is increased by the INA every 3-millisecond period and a 16-bit upstream slot marker pointer. The upstream slot marker pointer contains a value representing a number of symbols. For convenience we shall refer to this number of symbols as UMV (or Upstream Marker Value). A symbol is a discrete piece of transmitted data. Symbols may comprise one, two, three, four or more bits each depending on what kind of modulation scheme is used to transmit the symbol. The UMV designates the number of symbols which must be counted from the beginning of the next MPEG-2 frame to the start of a three millisecond period. The NIU detects the next MPEG-2 frame after the MAC message by looking for the start of MPEG-2 header which is a hexadecimal value of 47. The NIU then counts UMV number of symbols. When UMV symbols have been counted, the beginning of the 3-millisecond period commences. The 3 millisecond periods are further divided into upstream transmission slots and free intervals. Other information within the MAC control message identifies specific slots that have been allotted to the particular NIU for upstream transmission. It is this timing information that may be used by the INA to synchronize its message upstream. In the DVB case, initializations and periodic adjustments, similar to those needed in the MCNS case, are necessary.

Thus there is a need in the art for cable modems that can synchronize and efficiently adjust their upstream transmission timing in order to accurately schedule upstream burst transmissions.

To overcome the limitations in the prior art described above, the specification discloses a system and method for synchronizing network transmissions, such as cable network transmissions, in remotely located units. Embodiments of the present invention may synchronize local clocks to a system time kept by a master clock in a cable network system, or may synchronize local clocks to transmission times. Embodiments of the present invention can be implemented in a computer under program control to minimize hardware complexity and to provide flexibility for system changes.

MCNS Version

In preferred exemplary MCNS embodiments, the system includes in each user modem: a local clock, a message receiver to store messages in memory, a time tag generator to insert into memory the value of the local clock when each message arrives, a computer capable of accessing the memory, and a computer program to extract the transmitted system time from selected messages and to calculate and synchronize the local clock to the transmitted system time. Preferred embodiments utilize a local clock, within the cable modem, implemented in hardware as a source of local timing and flexible firmware to both extract the system time transmitted from the head end from selected messages, to implement a Software Phase Locked Loop (SPLL) that synchronizes the local clock to the system time received from the CMTS, and to control the transmission of upstream messages.

DVB Version

A second preferred embodiment of the invention for DVB systems includes the same hardware elements as a preferred MCNS embodiment. The computer program in the DVB embodiment is changed, however, to account for the difference in synchronizing data. In the DVB embodiment, there is synchronizing information in an MPEG-2 Transport Stream (TS) packet or frame known as a MAC control message. Synchronization information within certain enabled MAC control messages frames points to a beginning of a 3-millisecond period. The 3-millisecond period is a time period when an upstream transmission period is to begin.

A SPLL similar to that found in the MCNS embodiment will be used to lock to the beginning of the upstream 3 millisecond period, so that the beginning of the transmit period, in terms of local time, may be found.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 9b is a block diagram of the recovered timing generator of FIG. 9a.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, although the description and drawings reference a cable network system, it is understood that embodiments of the present invention may be used, for example, to synchronize elements in other types of networks such as fiber optic cable and wireless networks, or any system in which subsystems need to accomplish synchronized transmissions.

Figure 1A:
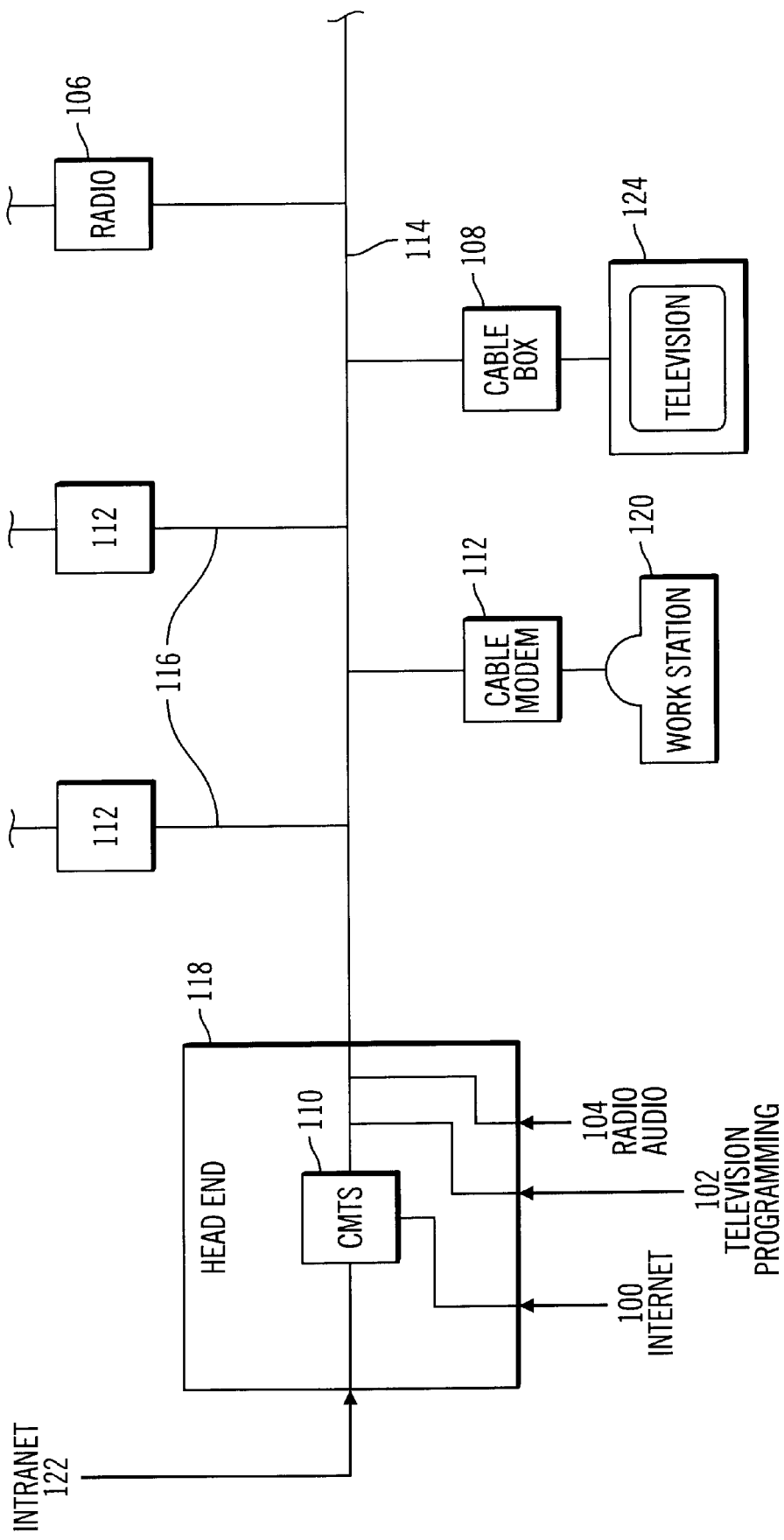
FIG. 1a is a block diagram of a common MCNS cable network system.

FIG. 1a is a simplified schematic of a MCNS type cable network system in which the present invention may operate. There is a cable modem termination system (CMTS) 110, located in the head end 118. The head end of the cable system may receive data in various forms from various sources. For example the head end 118 may receive television programming 102, radio audio 104, Internet data 100, and intranet data 122 available only to cable system subscribers. Various equipment, such as radio 106, cable boxes 108, and televisions 124 may be connected to the cable 114. In addition multiple user modems 112 may be connected to the head end through a distribution system comprised of one common cable 114 and a dedicated drop 116 for each user modem. The CMTS 110 can send downstream data to the user modems 112 to control the transmission of upstream data. The CMTS controls upstream transmission by sending control messages to the user modems 112. The user modem typically sends data to and receives data from a device such as a computer work station 120.

Figure 1B:
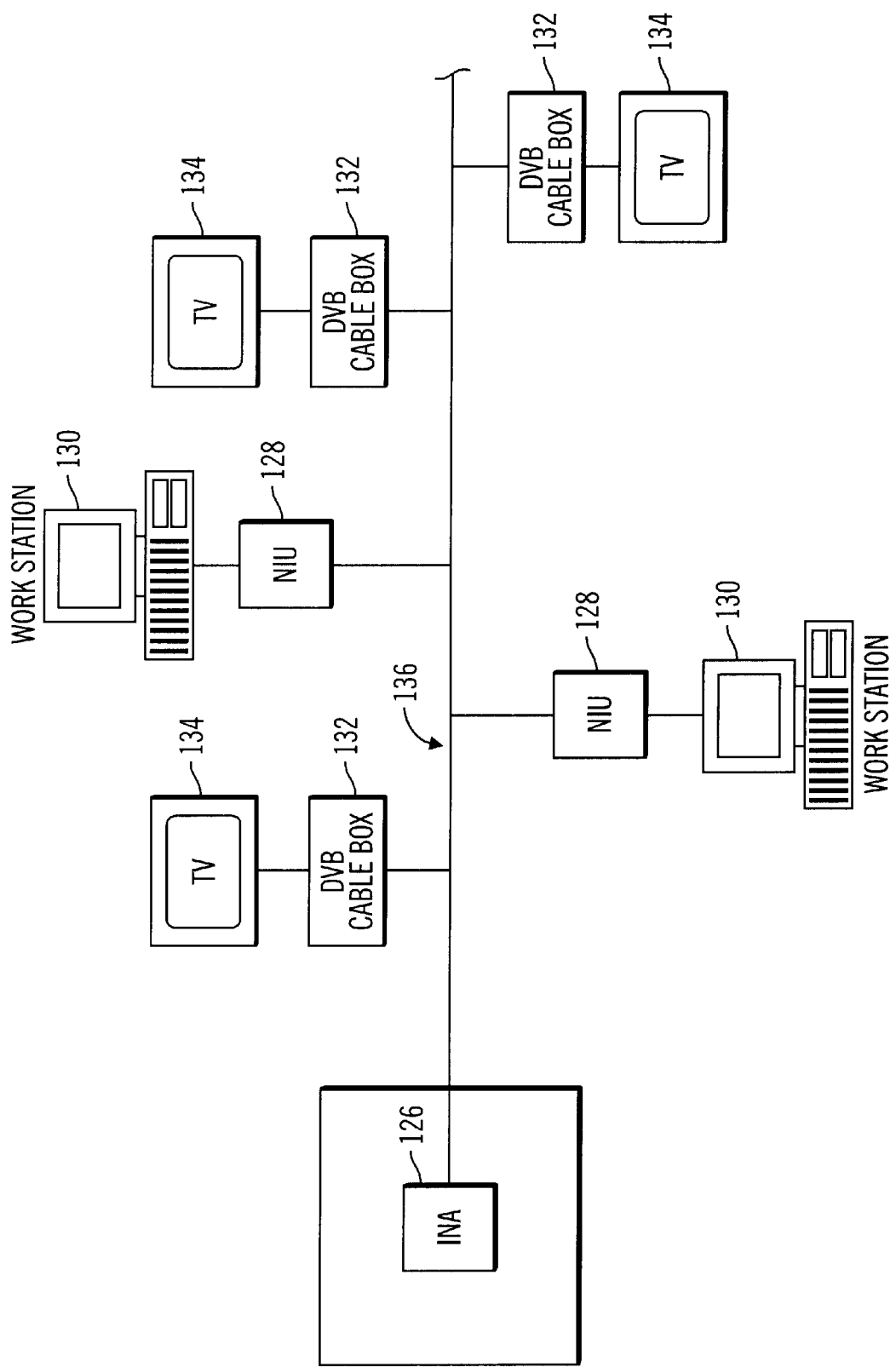
FIG. 1b is a block diagram of a common DVB cable network system.

FIG. 1b represents the differing terminology and similar topology seen in a DVB cable system. In a DVB cable system, the INA 126 takes the place of the CMTS. It is the INA 126 that controls the cable 136. The cable 136 interfaces with, in one instance, DVB cable boxes 132 which are then further coupled to television receivers 134. The cable 136 also interfaces with a NIUs 128 which are then further coupled to a workstation 130. It is the NIUs 128 which can receive data from and transmit messages to the INA 126.

MCNS Embodiment.

Figure 2:
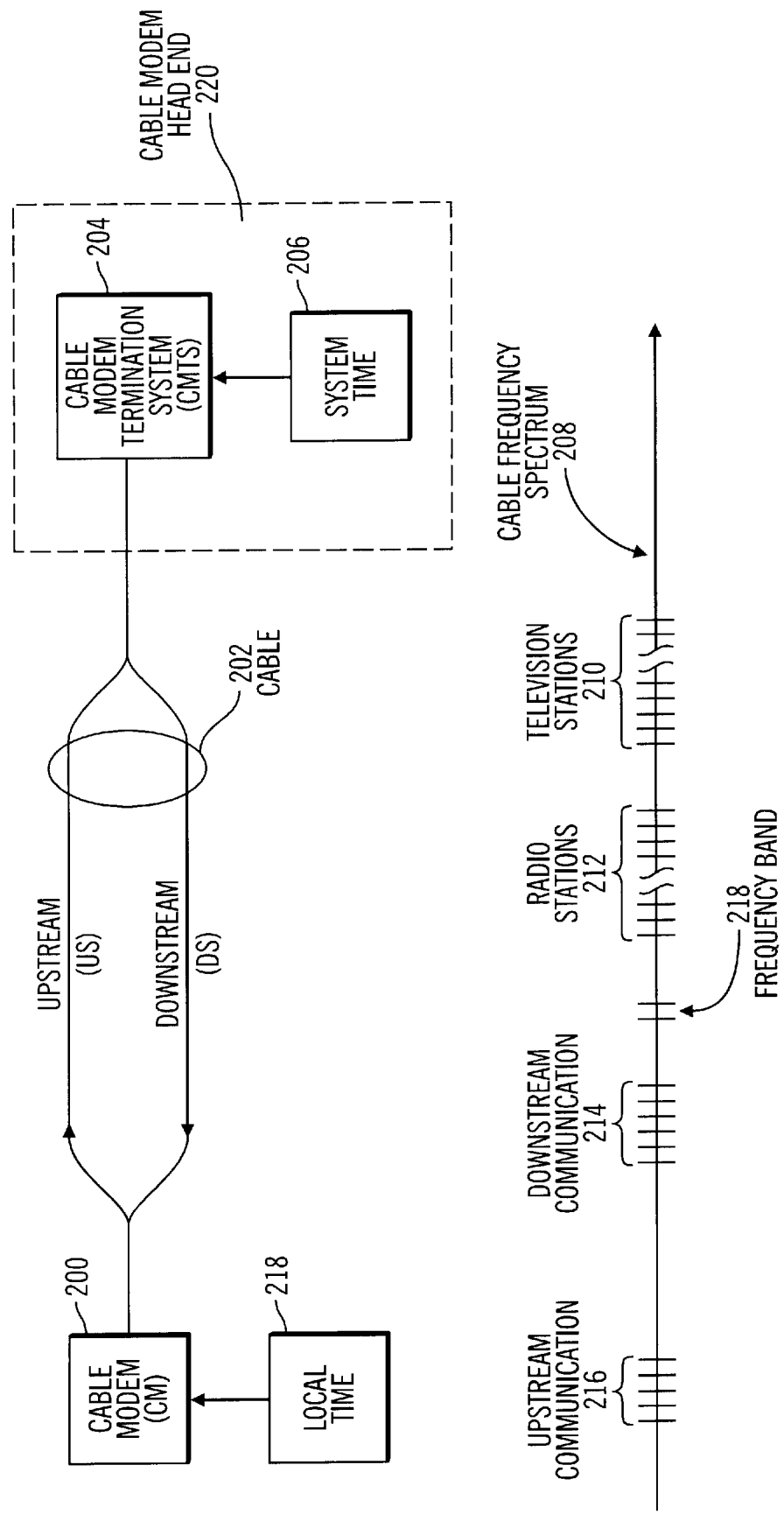
FIG. 2 is a block diagram illustrating a generalized cable modem system, along with a graphic illustration of frequency spectrum allocation within the cable modem system.

FIG. 2 is a block diagram illustrating a generalized MCNS cable modem system, along with a graphic illustration of frequency spectrum allocation within the cable modem system. A cable modem (CM) 200 is connected to a cable 202. The cable 202 provides both downstream and upstream communications between the CM 200 and a CMTS 204. The CMTS 204 is contained within the cable modem head end 220. The CMTS 204 receives system time from a master clock 206. Similarly the CM 200 measures local time 218, in the present preferred embodiment, using a 32 bit counter in order to time its transactions. The cable 202 is capable of carrying a wide band of frequencies generally known as its frequency spectrum. The cable frequency spectrum 208 is often divided into discrete frequency bands 218. For example the cable frequency spectrum 208 may be divided into discrete bands for television stations 210, radio stations 212, downstream communications 214, and upstream communications 216. The DVB protocol is similar with an NIU being substituted for the CM and an INA replacing the CMTS.

Figure 3:
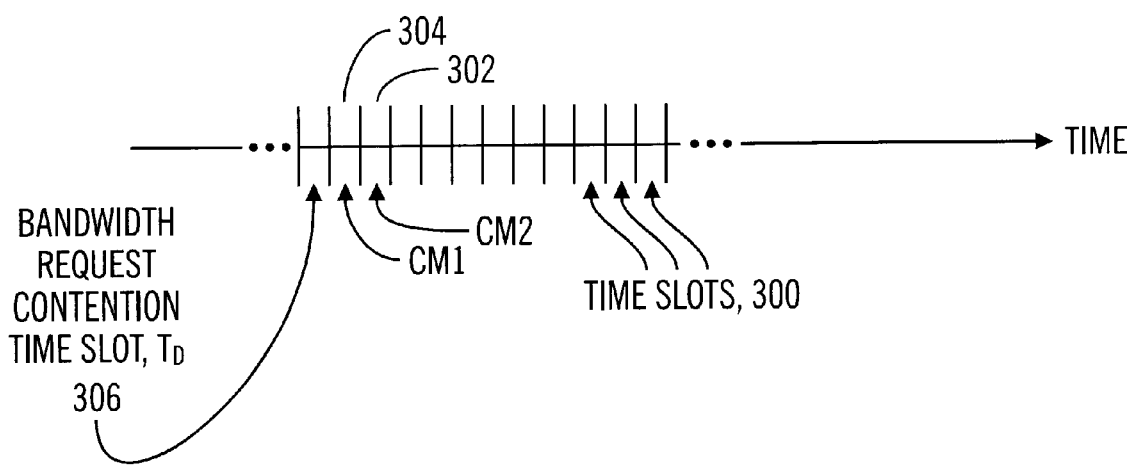
FIG. 3 is a graphic illustration of upstream TDMA (Time Division Multiple Access) communications in a cable modem system.

FIG. 3 is a graphic illustration of upstream TDMA (Time Division Multiple Access) communications in a MCNS cable modem system. Upstream transmissions are separated in time so that they do not interfere with each other. Each upstream transmission is assigned a time slot 300. When a cable modem wishes to establish a connection it broadcasts its request in a bandwidth request contention slot $t_0$ 306. Because other cable modems may be requesting bandwidth the requests may collide and have to be rebroadcast. When the CMTS receives a request it assigns the cable modem a time slot, for example cable modem 1 (CM1) is assigned slot 304 and cable modem 2 (CM2) is assigned slot 302. Cable modem time slot assignments are communicated to cable modems using map messages which provide the cable modems on the network with a mapping of the upstream time slots.

Figure 4:
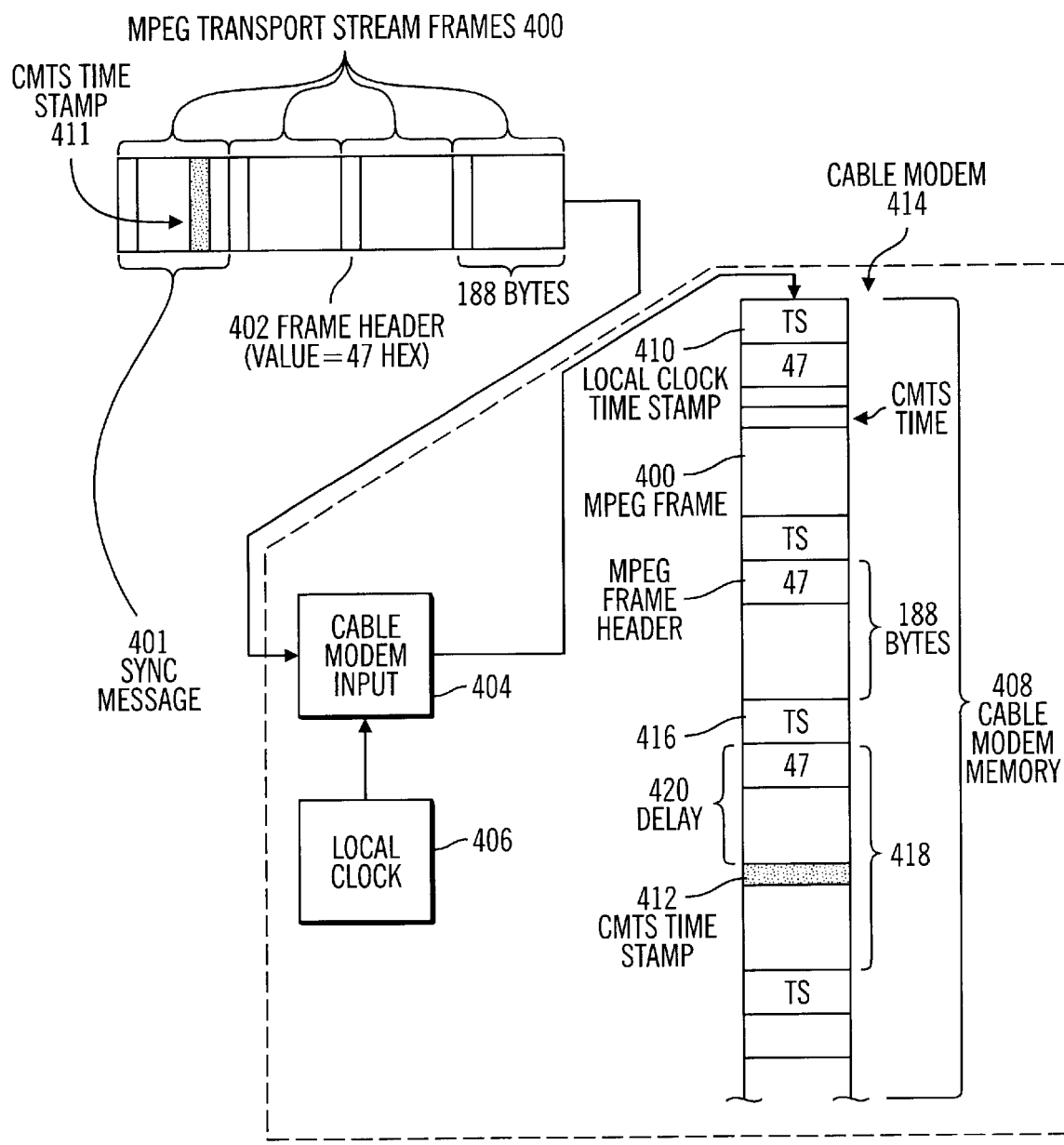
FIG. 4 is a graphic illustration of the receiving and processing of the downstream communications in a cable modem system.

FIG. 4 is a graphic illustration of the receiving and processing of the downstream communications in a cable modem system by an embodiment of the invention. In the present illustrative embodiment the CMTS 110 communicates with a cable modem 414 through the transmission of data formatted within MPEG-2 frames 400. Each MPEG-2 frame begins with a frame header 402 (a byte hexadecimal value of 47) and is 188 bytes long. The MPEG-2 frames 400 are received by the cable modem 414 into the cable modem input 404 which extracts the MPEG-2 frames from the RF carrier frequency and places them into the cable modem memory 408. The cable modem input 404 also accesses the local clock 406 and places the value of the local clock in cable modem memory 408. The value of the local clock placed in cable modem memory 408 serves as a time stamp 410 indicating the local time 218 when each MPEG-2 frame arrived. Some of the MPEG-2 frames are SYNC messages 401 that contain synchronization information such as a CMTS time stamp within them, for example 411. The CMTS time stamp indicates the system time 206 of the master clock when the CMTS time stamp was sent.

In a preferred MCNS embodiment, a local clock is sampled to record the time 410 when each message is received by the message receiver. In this embodiment, the typical message is formatted in MPEG-2 (Motion Picture Experts Group) frame format, however, this format is not a requirement for embodiments of the invention. All that is required of the message format is that messages are of a known length, are transmitted periodically, and may be recognized using a frame marker that has a fixed location within the frame. If the messages are of a known length, then by comparing the time elapsed in terms of the local clock to the known period required for the arrival of the entire fixed length MPEG-2 frame, the actual frequency of the local reference clock may be calculated.

In a preferred MCNS embodiment, the CMTS (Cable Modem Termination System) transmits the system time to each cable modem by inserting a SYNC MCNS MAC (Media Access Control) Management Frame 401 within the Transport Stream stream of MPEG-2 frames. MCNS SYNC messages 401 contain a global timing reference commonly known as the system or CMTS time. Each cable modem may access the system time by searching each received MPEG-2 frame for a SYNC message. Once this type of frame is located, the firmware may extract the system time from the SYNC message. This particular message format is not a requirement of the embodiment. All that is required is that the CMTS embed identifiable global timing references within the messages sent to the CM.

In a preferred MCNS embodiment, the CMTS (Cable Modem Termination System) must both measure and compensate for fixed delays between the CMTS and the CM (cable modem). The measurement of these fixed delays is undertaken through two types of MCNS MAC Management Messages sent within the MPEG-2 frame format. The first message is the Range Request Message sent from the CMTS to the CM. This message tells the CM to transmit a ranging response MCNS MAC Management Message, back to the CMTS so that it arrives at the CMTS at a specified system time that is embedded within the range request message. Upon reception of a ranging response message from a particular CM, the CMTS can compute the difference between the time that the ranging response message was received and the time at which the ranging response message was expected. This difference represents the measure of the fixed delay in the system between a particular CM and the CMTS. In order to compensate for this fixed delay in the system, the CMTS utilizes a third message MCNS MAC Management Message entitled Ranging Phase Adjustment. This message transmits the measure of fixed delay in the system (a.k.a. phase offset) between a particular CM and the CMTS, as determined by the ranging process, from the CMTS to the particular CMTS. Once the CM locates and extracts this phase offset from the Ranging Phase Adjustment message, it uses this value to adjust its transmission time so that future errors due to fixed delays are eliminated from the system. In the current embodiment these three types of messages are present in the system, however, the invention is in no way limited to these specific MCNS framing formats, and does not depend on them.

Upon reception of each MPEG-2 frame 400, the CM hardware samples the local clock 406 and tags the MPEG-2 frame with the local clock value 416. This tagging process occurs in the following manner: upon recognition of the MPEG-2 SYNC word 412 in the MPEG-2 frame, the hardware samples the value of the local clock. Next, the hardware inserts the local clock time value into a memory location 416 that the software associates with the arrival time of that MPEG-2 frame 418. The preferred embodiment carries out this operation for every MPEG-2 frame that arrives at the CM. In the present embodiment there is a delay 420 between the time when the MPEG-2 SYNC byte is recognized by the CM and the time when the CM samples the local clock.

The local time tagged to every MPEG-2 frame is used for two purposes. The first is to calculate the frequency of the local clock. The second is to compute the elapsed time in units of the local clock between the arrival of two SYNC words received from the CMTS. These inputs and the ranging process ensure that the CM has all the information required to synchronize CM to the CMTS time and maintain accurate upstream transmission.

The length of each MPEG-2 frame is fixed at 188 bytes for this embodiment and the system tags each MPEG-2 frame as it is received with the sampled value of the local time. Because the elapsed time to receive 188 bytes can be computed the CM may, using Equation 1, determine the frequency of the oscillator (Fclock) that clocks the local time generator's 32 bit counter.

$$\text{Local Frequency } (n) = (T(n)-T(n-1))/188 \text{ clocks/byte} \qquad \text{Equation 1}$$

where T(n) is the local time at the beginning of the n'th frame and T(n−1) is the local time at the beginning of the (n−1)th frame.

Equation 1 represents the instantaneous value of local frequency of the local time clock. It may be actually preferable to use an averaged value of the clock frequency. The preferred embodiment implements a moving average of the instantaneous local clock frequency at time "n" as shown in Equation 2:

$$ALF(n)=(T(n)-T(n-y))/y \qquad \text{Equation 2}$$

Where ALF(n) is equal to the Average Local Frequency (n), i.e., the Average Local Frequency at time n Y is a power of 2 to provide for a quick hardware divide capability. In the present embodiment the Average Local Frequency is computed in HW and may be read by the firmware as needed. The value of y may be programmable to allow for the adjustment of the averaging period.

Figure 5:
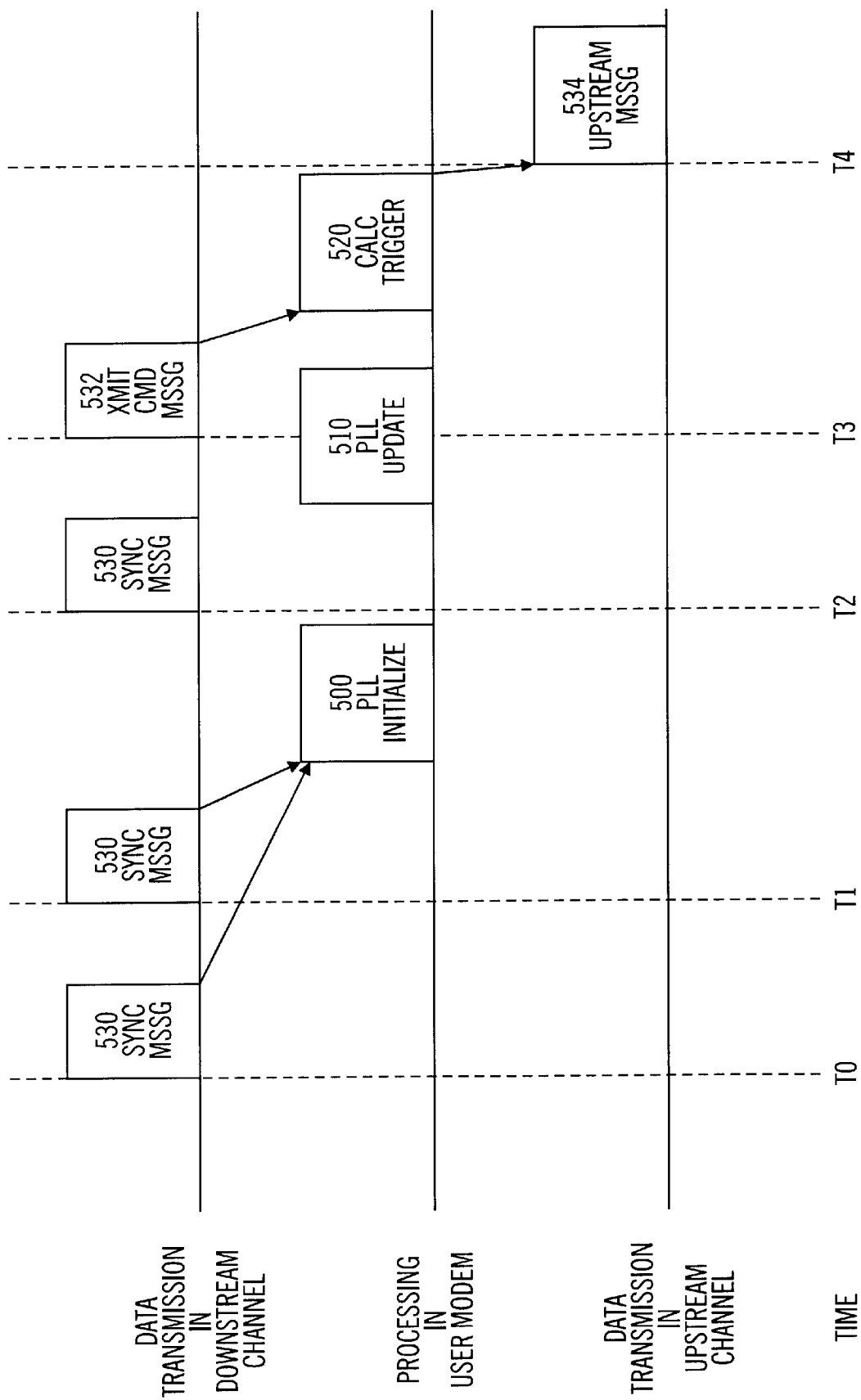
FIG. 5 is an illustration of a possible time sequence of messages and user modem processing.

FIG. 5 illustrates a typical time sequence of message transmissions in a cable network. The upstream and the downstream channels may be transmitting messages simultaneously. The CMTS 110 transmits synchronization messages 530 periodically in the downstream channel. The period between synchronization messages 530 need not be constant. When the CMTS 110 determines that an upstream message 534 should be transmitted, it sends a transmit command message 532 to the user modem. The user modem transmits its message in the upstream channel at the time specified by the CMTS in the transmit command message 532. The functions Phase Lock Loop (PLL) Initialize 500, Phase Lock Loop Update 510, and Calculate Trigger Value 520 may be performed by an embodiment of the current invention.

Figure 6:
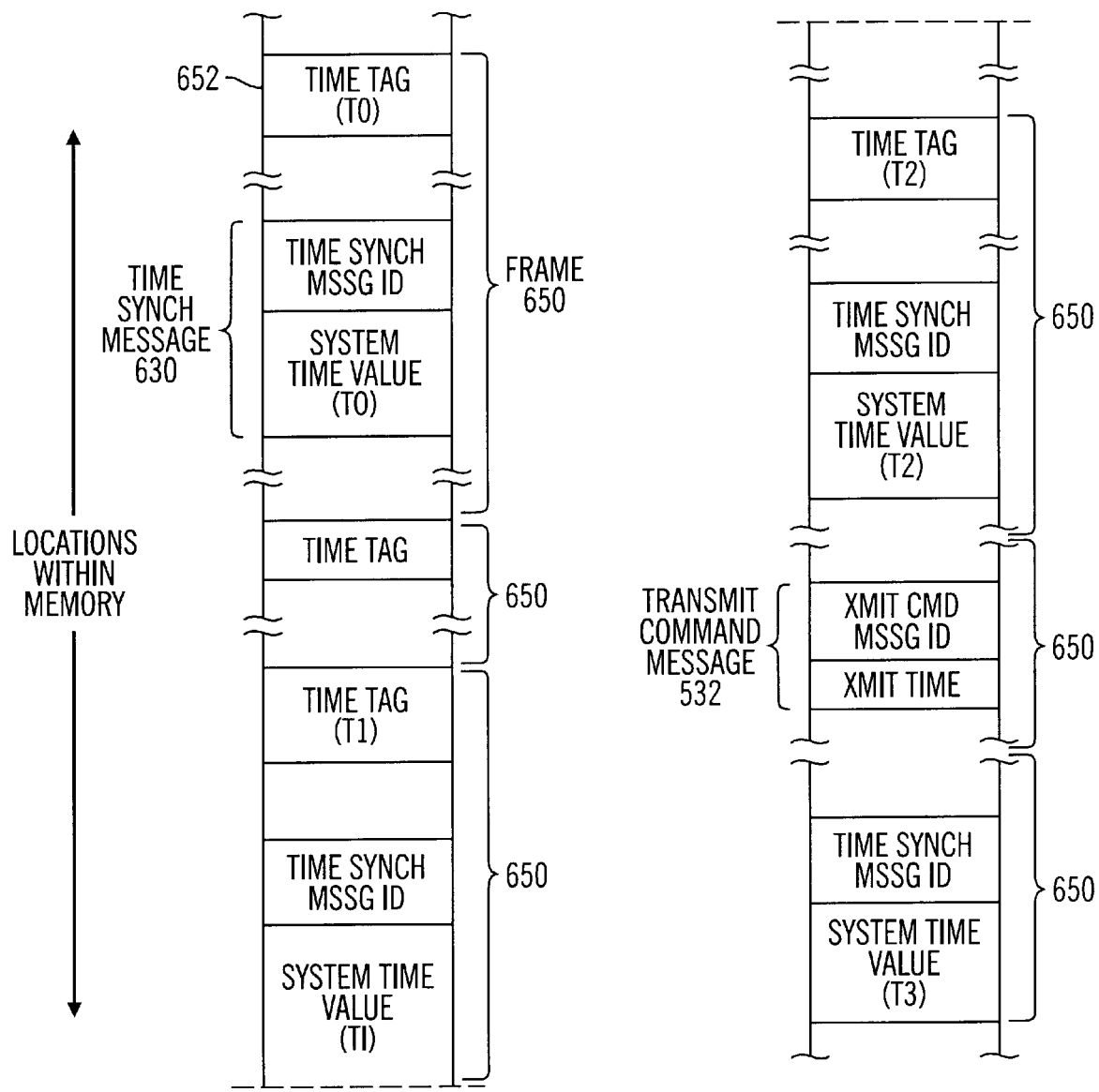
FIG. 6 is an illustration of the arrangement of data in memory according to an embodiment of the present invention.

FIG. 6 depicts a possible arrangement of cable modem data stored memory in an embodiment of the invention. Data is transmitted from the CMTS in units called frames 650. For example, the system may use MPEG-2 frames, which each contain 188 bytes. Data within the frames is organized into messages, for example the time synchronization message 630. A time tag 652 containing the value of the local clock when the first byte of each frame arrived at the cable modem is stored in memory along with the messages from the frame. The transmit command message 532 contains a transmit time measured in system time.

The CM computes elapsed time between CMTS time stamps in the MPEG-2 stream in units of local time in the following manner. First, the CM computes the local time equivalent to the received CMTS time stamp as shown in Equation 3:

$$LT(n)=SN*ALF(n)+T(n) \qquad \text{Equation 3}$$

where ALF represents the Average Local Frequency. SN represents the byte number of the start of the SYNC message within the MPEG-2 frame, and T(n), represents the local time tag associated with the arrival of first byte of the nth MPEG-2 frame which contains the SYNC message.

Next, the CM computes the elapsed time (ET(n)), between the arrival of the two CMTS time stamps in units of local time using Equation 4:

$$ET(n)=LT(n)-LT(n-1) \qquad \text{Equation 4}$$

Where LT(n) is the local time of the nth SYNC message and LT(n−1) is the local time of the n−1$^{st}$ SYNC message. A more general version of Equation 4 may also be used by the CM as shown in Equation 4a:

$$ET(n)=LT(n)-LT(n-y) \quad 1<y<\text{infinity} \qquad \text{Equation 4a}$$

In equation 4a the SYNC messages are not restricted to sequential SYNC messages. Y defines the decimation period, that is the period between samples.

Figure 7:
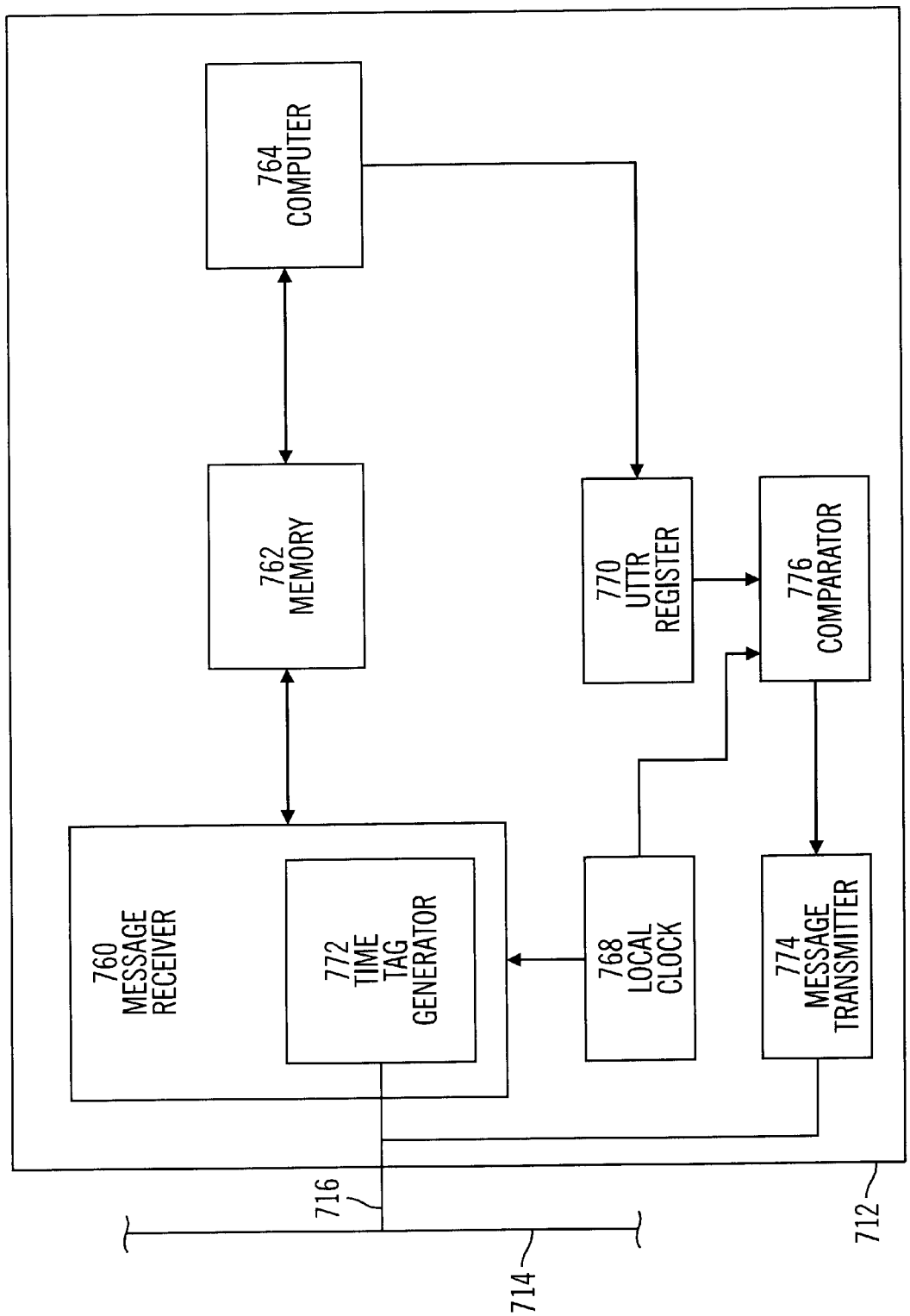
FIG. 7 is a block diagram of a user modem according to an embodiment of the present invention.

FIG. 7 illustrates a block diagram of a cable modem 712 containing a preferred embodiment of the invention. Cable modem 712 is connected to cable 714 by dedicated drop 716. The message receiver 760 provides a physical interface to the distribution system, performing such duties as detecting the RF and storing the contents of the messages into memory words. The time tag generator 772 captures the value of the local clock 768 when the first byte of each frame 650 arrives at the user modem, storing the value of the local clock as the time tag 652 in memory 762. The computer 764 reads the contents of the messages from the memory 762 along with the time tags 652. The computer 764 calculates an event trigger value and loads it into the UTTR (Upstream Time to Transmit Register) register 770. When the value of the local clock 768 is equal to the trigger value, the comparator 766 sends a signal to the message transmitter 774 to cause it to transmit an upstream message.

The computer 764 contains a stored program containing the Software Phase Lock Loop (SPLL) which is used to determine the Recovered Time (RT) and to determine if the RT maintained by CM is synchronized to the System Time at the CMTS.

Once the CM has synchronized the transmission time of the system clock of the CM to the CMTS, the CM may begin the process of transmitting data to the CMTS. The CM transmits data to the CMTS in particular upstream timeslots. The upstream transmission time slots are defined by the CMTS, using MCNS MAP Messages, for each CM in the system. These messages are transmitted to all cable modems on the downstream channel and provide a means for allowing the CMTS to assign transmission time slots to each CM that wishes to transmit data upstream to the CM. The CMTS makes upstream transmission time slot assignments within MCNS MAP message using an ID that is unique to each CM and a value of the CMTS system time that indicates when the selected CM should begin transmitting it's data to the CMTS. When the CM analyzes an MCNS MAP message and finds that it has been allocated a transmission time slot, it a requirement of the system that it begin transmitting data synchronized with the time specified by CMTS within the MAP message. In the preferred embodiment, upstream transmissions can be transmitted in the correct time slot once the Software Phase Locked Loop (SPLL) has been synchronized to the system time at the CMTS.

In the preferred embodiment, the CM upstream transmission circuitry consists of a 32 bit Upstream Time to Transmit Register (UTTR) 770 that holds the local time at which the upstream transmission circuitry will begin transmission of an upstream data frame to the CMTS, a 32 bit comparator 766, and the 32 bit free running counter (local clock) 768. After the CM has been granted an upstream transmission timeslot by the CMTS and the CM firmware has extracted the transmission time from MAP message, then the CM firmware must translate the transmission time into an equivalent local time, program the translated transmission time into the upstream transmission time register, and enable the upstream transmission circuitry for transmission. When the value of the local clock matches the value of local time programmed into the upstream transmission time register (UTTR) 770, then the upstream transmission circuitry can begin to transmit its data upstream.

Figure 8:
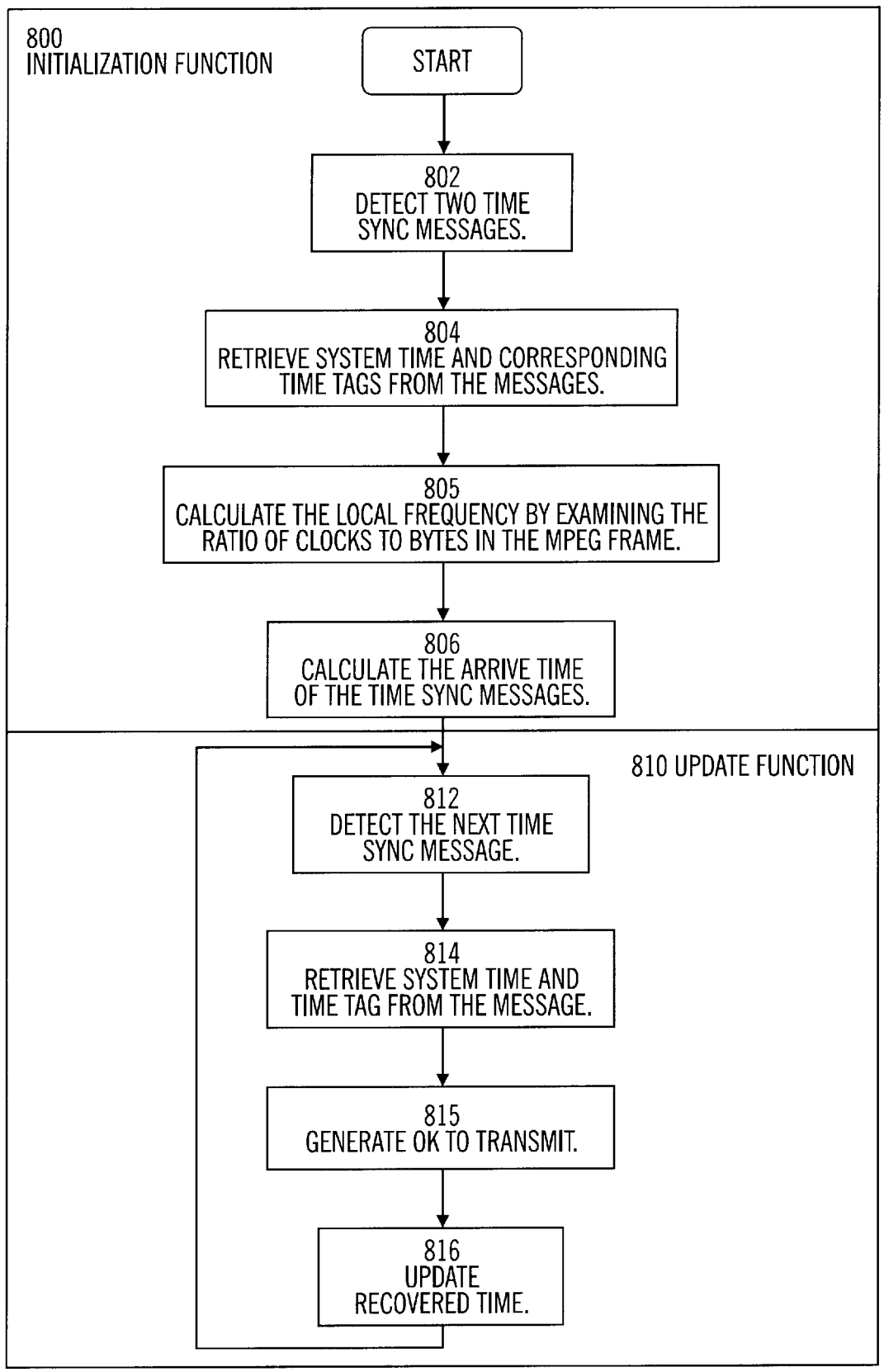
FIG. 8 is a flow chart of a method for calculating reconstructed time synchronized to system time according to an embodiment of the invention.

FIG. 8 shows a block diagram of the Initialization Function 800 and the Update Function 810 that comprise the Program to Calculate Recovered Time. The program may be replaced with an enhanced version without requiring modification of the hardware components. In some embodiments, an enhanced version of the program may be transmitted from the CMTS to the user modem without intervention by the user.

To perform step 802 in FIG. 8, the computer scans the data in memory (FIG. 6) until it finds the Message Identifiers for two Time Synchronization Messages 630. In step 804, the program reads the System Time contained in each Time Synchronization Message and the Time Tag 652 placed in memory by the time tag generator 772. In step 805 the computer calculates the local frequency of the local time clock by examining the ratio of the number of local time clocks to the bytes in the MPEG-2 frame as described in Equation 1 and Equation2. In step 806, the time of arrival of the time sync messages is calculated.

After the completion of the Initialization Function the Program to Calculate Recovered Time performs an Update Function 810 as shown in FIG. 8. In step 812, the computer 764 scans the memory 762 until it detects the occurrence of a Synchronization Message 530. In step 814, the computer reads the System Time contained in the Synchronization Message and the Time Tag 652. In step 815, an OK to Transmit Signal is generated.

In step 816 the computer 764 calculates new estimates for the Recovered Time and the OK to Transmit Signal. RT represents a local version of the CMTS system time. Having the CMTS system time local in the Cable Modem allows the CMTS system time (206) to be referenced to local time (218). The OK to Transmit Signal is produced by determining the error between the current value of the Recovered Time and the current received value of the CMTS system time. If this error is less than a user defined threshold then the CM is considered to be synchronized to the CMTS and may safely transmit messages upstream.

In a preferred MCNS embodiment, the firmware within the cable modem implements a SPLL (Software Phase Locked Loop) to synchronize an accumulator to the master clock within the CMTS. Once the SPLL has synchronized to the CMTS master clock, its frequency and phase will track that of the master clock present in the CMTS on a long term basis in a way that may be flexibly programmed. Once this synchronization occurs, the CM may safely transmit data within any upstream time slots assigned to it by the CMTS. The instantaneous value of the synchronized SPLL accumulator will be referred to as the Recovered Time (RT). If the absolute value of the error between the RT and the system time received from the CMTS is less than a user defined threshold then the CM is considered to be synchronized. Additionally a hysterisis criteria may be defined such that if the absolute value of the error between the RT and the system time received from the CMTS is less than a user defined threshold for X times in a row then the CM is considered to be synchronized.

Figure 9A:
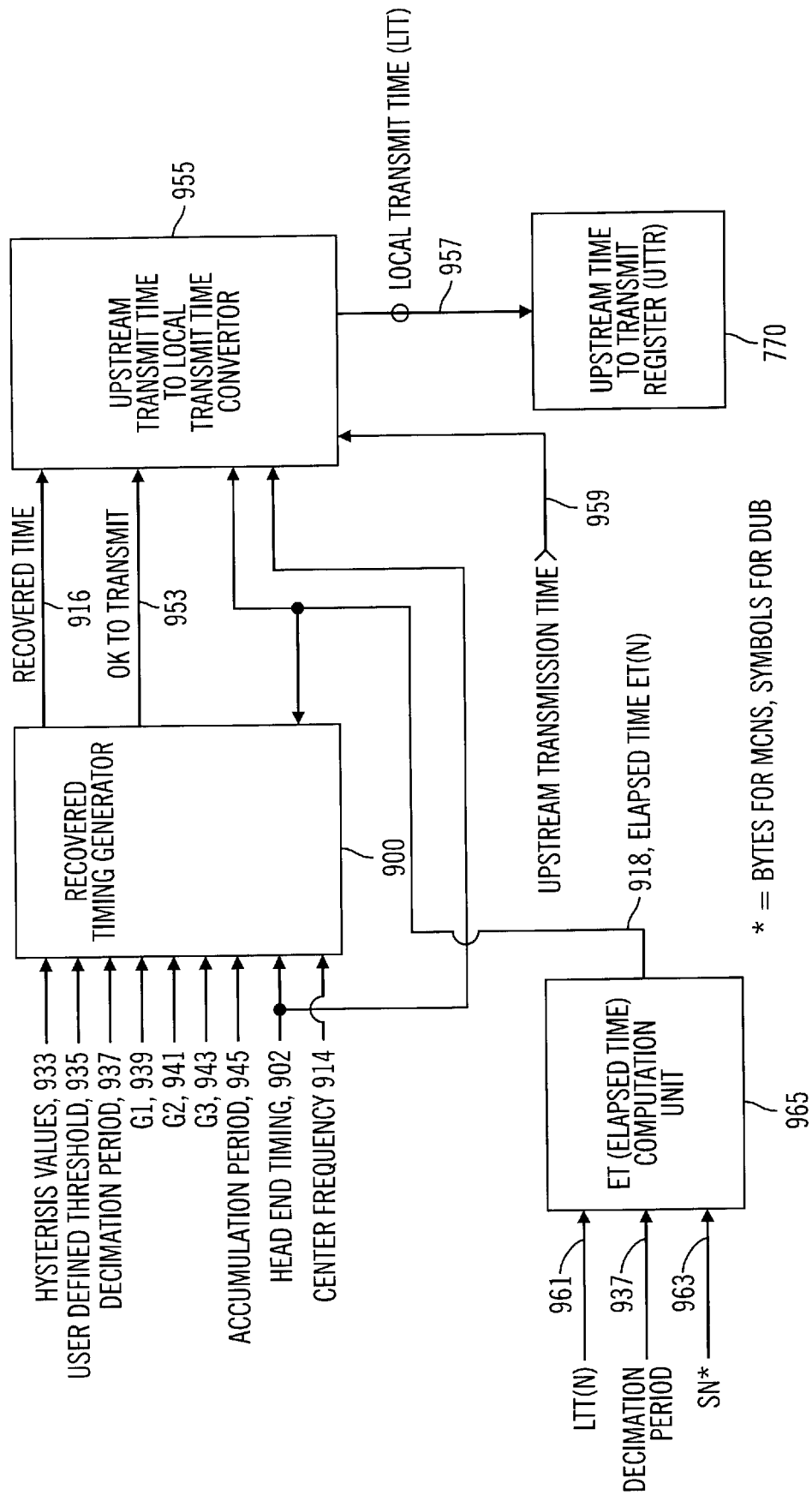
FIG. 9a is a block diagram of an embodiment of the invention as may be used to synchronize upstream burst transmissions in a cable system.

FIG. 9a is a block diagram of an embodiment of the invention as may be used to synchronize upstream burst transmissions in a cable system. The recovery timing generator 900 contains the circuitry which generates upstream burst timing from information provided by the cable system head end. The recovery timing generator 900 has several input settings for system parameters as well as an input for head end timing 902 and elapsed time 918. The head end timing input 902 accepts CMTS times stamps that are used in generating upstream burst transmission timing. The elapsed time input 918 is used for accepting locally measured elapsed time between received CMTS SYNC messages.

The elapsed time value ET(n) is generated by the elapsed time computation unit 965. The elapsed time computation unit accepts local time tags T(n) for the start and end of the decimation period 937. The elapsed time computation unit 965 also accepts an input SN 963 and Local Time Tag LTT(N) 961 containing the arrival time of the first byte of the nth frame. In the case of the MCNS embodiment SN represents the byte number at the start of the SYNC message within the MPEG-2 frame. In the case of the DVB embodiment, SN represents the symbol number instead of the byte number.

The recovery timing generator 900 accepts several system parameter inputs which may be used to tailor the system to various implementation requirements by adjusting parameters within the recovery timing generator 900.

The hysterisis values 933 controls the number of times in a row that the error 920 value must be less than the user defined threshold 935 before the comparator 921 signals that it is OK to Transmit 953. The default case hysterisis value of the present illustration embodiment is 1. The user defined threshold 935 controls the generation of the OK to transmit signal 953. The user defined threshold 935 controls the amount of timing error that will be tolerated and still allow an upstream burst transmission. By adjusting this input a variety of timing tolerances can be accommodated. The decimation period 937 controls the frequency, of the computation of the RT. Gains G1 939, G2 941, and G3 943, are system gains which control various parameters of the Software Phase Lock Loop (SPLL) that is used within an embodiment of the recovered timing generator 900. Accumulation Period 945 sets a multiply factor proportional to the period for the multiplying accumulator (912 of FIG. 9b). The Accumulation Period is equal to the Elapsed Time mentioned previously. The center frequency 924 is an initial value for the Software Phase Lock Loop (SPLL) that is used within an embodiment of the recovered timing generator 900 to provide a starting point for the SPLL. It may be eliminated with the penalty that the SPLL will take longer to synchronize. 916 the recovered time output from the recovered timing generator provides recovered head end timing information synchronized to and derived from the head end timing input 902.

Block 955 the upstream transmit time to local time transmit converter accepts the recovered time 916, the local time 918, and the upstream transmission time 959 (derived from head end information) and the OK to transmit 953 and generates an upstream burst transmission time in terms of the local time 918. The upstream transmit time to local time transmit converter 955 generates and provides the local transmit time 957 (LTT) to the Upstream time to transmit register 770.

Figure 9B:
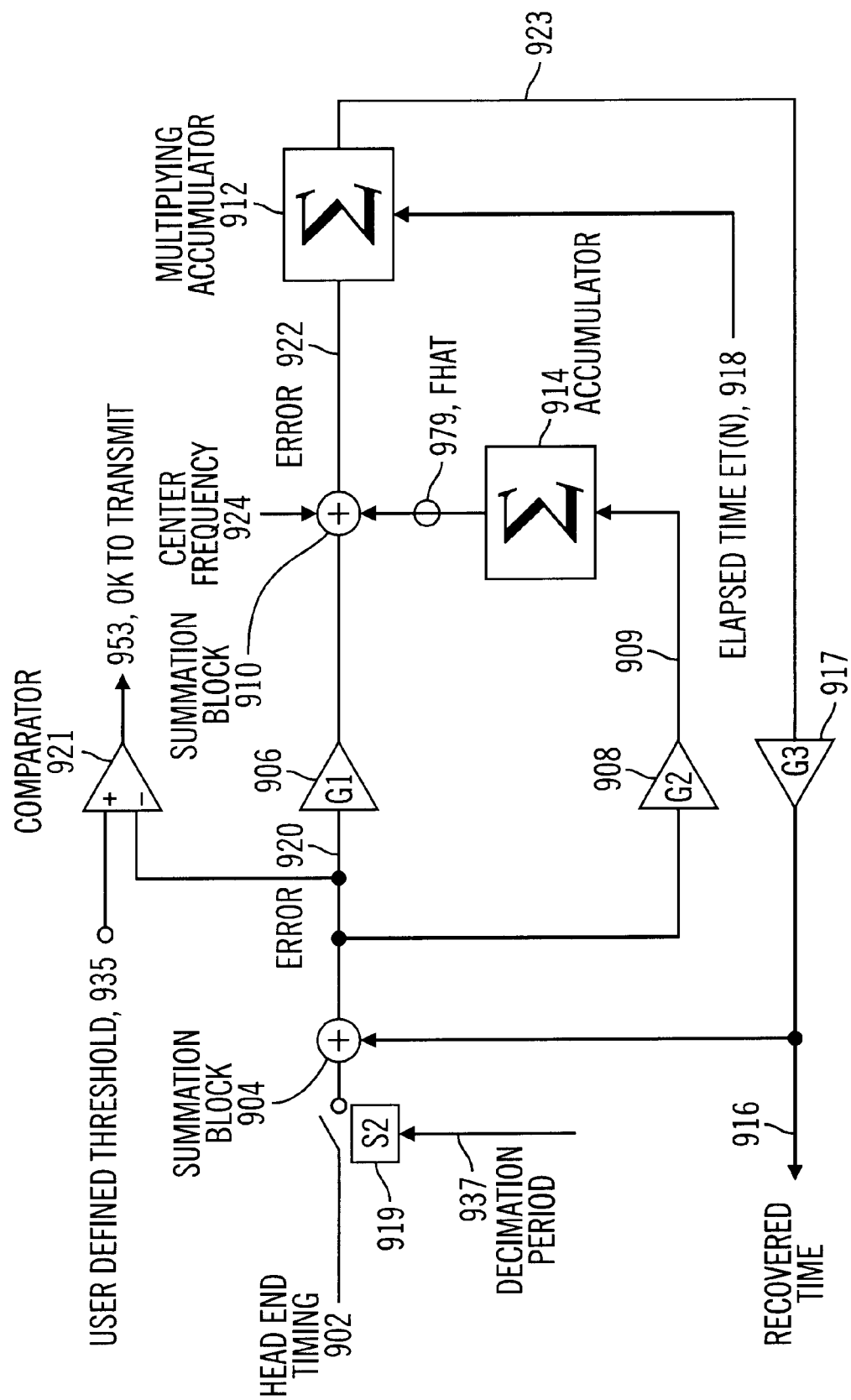

FIG. 9b is a block diagram of the Software Phase Lock Loop (SPLL) mechanism used to calculate Recovered Time. As may be appreciated by those skilled in the art the Recovered Timing Generator 900 may be accomplished using a hardware implementation, a software implementation, or a combination implementation. In the present preferred embodiment the Recovered Timing Generator 900, is implemented in software to provide the ability to flexibly change the programming. The mechanism of FIG. 9 is a recovered timing generator 900 which accepts a head end timing signal 902 and generates a recovered time signal 916 which represents timing expected by the head end in upstream broadcasts. The recovered timing generator 900 corrects the recovered time, so long as it is receiving head end timing information. The mechanism to calculate recovered time will be described with reference to a particular embodiment in which the only hardware component is a 32 bit counter which generates local time. This particular embodiment is desirable because it permits the recovered time generator 900 to be updated without the physical intervention by simply downloading new software.

In both FIGS. 9A and 9B, a summation block 904 accepts head end timing information 902. The information is then coupled into the system when the switch s2 919 is closed. The rate at which the switch is closed is the decimation period 937. The current recovered system time 916 is subtracted from the head end timing information 902 to create an error representation 920. The error 920, representing the difference between the head end timing information 902 and the recovered time 916, is coupled into a first gain stage 906 which has a gain G1. The value of G1 is a system parameter that may be controlled by a user to tailor the SPLL to their requirements. The gain stage 906 multiplies the error 920 by the user defined gain G1 and couples an output value representing the phase difference between the recovered time and the head end timing information 902. The output value of the gain stage 906 is then coupled into a summation block 910. The error 920 is also coupled into a second gain stage 908, which then multiplies it by a gain G2 and couples an output value into accumulator 914. The accumulator 914 accumulates the output value provided to it by the second gain stage 908 over a period representing the elapsed time 918 between successive head end timing information 902 periods which are coupled into the summation block 904 at periods controlled by the decimation period 937 which controls switch s2 919. The output of the accumulator 914, which represents an integration of the error over time i.e. a frequency difference, is then is coupled into summation block 910 where it is added to the output of amplifier 906. The output of G1 906 and the Fhat 929 are summed by summation block 910 and the output of summation block 910 is coupled into a multiplying accumulator 912. The output 923 of the multiplying accumulator is then coupled through a gain 917 to produce the Recovered Time 916. The Recovered Time 916 is then coupled into the summation block 904 where it is subtracted from th head end timing information 902.

The error between the head end timing 902 and the recovered time 916, i.e. Error 920 is coupled into a comparator 921 where it is compared with a user defined threshold 935 in comparator 921. The output of the comparator 921 indicates if the error 920 is within limits small enough to allow upstream burst transmission.

Commonly, if the error 920 of the CM (CMTS time stamp 902—Recovered Time 916) is less than a given threshold U for Y times in a row then the SPLL is declared to be synchronized and the CM may begin transmitting frames upstream. Since in the present embodiment this is done in firmware, the variables U and Y may be flexibly chosen. Also, if the CM is locked and the phase error of the system is greater than or equal to a given threshold X for V times in a row then the CM is declared "out of lock." Since this is done in firmware, the variables X and V may also be flexibly chosen.

For fast frequency acquisition, the first two system time samples received from the CMTS may be used to calculate the first value of the Accumulator Output(0) 914.

$$\text{Accumulator Output(0) } 914 = ST(-1) - ST(-2) \qquad \text{Equation 7}$$

where accumulator output 914 at time 0 has an initial value of the difference between two successive past time stamps received from the CMTS.

MCNS Embodiment

In a preferred MCNS embodiment the mechanism of FIG. 9b is a detailed block diagram of recovered timing generator 900 which accepts CMTS time stamp information from data packets transmitted by the CMTS and, using a local time base, generates a recovered time 916, which corresponds to the CMTS time and an OK to TRANSMIT signal that serves to enable or disable upstream transmission based upon whether or not the SPLL illustrated in FIG. 9B is synchronized. The recovered time generator 900 corrects the recovered time, so long as it is receiving CMTS time stamps. The mechanism to calculate recovered time will be described, however, with reference to a particular embodiment in which the only hardware component is a 32 bit counter which generates local time. This particular embodiment is desirable because it permits the recovered time generator 900 to be updated without the physical intervention by simply downloading new software.

A summation block 904 accepts a CMTS time stamp 902. A switch 919 precedes summation block 904. Switch 919 is meant to show that the SPLL is not required to accept every received time stamp. The number of time stamps that are dropped before the switch closes is termed the decimation period. The decimation period is programmed by the user typically to maintain approximately 180 ms between SPLL loop updates. This feature allows the firmware to minimize the system bandwidth requirements of the SPLL. Given that the SPLL accepts a time stamp based upon the criteria defined by the decimation period, the SPLL must be updated when the time stamp is accepted. To perform a loop update, first the current recovered system time 916 must be computed. The current recovered system time 916 is computed by taking the previous value of ERROR 922 and multiplying it by the time that has elapsed between the current and last loop updates as calculated in equation 4a (where y is the decimation period) and adding this value to the previous output of the accumulator 912 multiplied by the elapsed time between SPLL updates. The equation for the computation is shown in equation 11.

$$\text{Accumulator 912 }(n) = \text{Accumulator } 912(n-1) + ET(n) \ ^*\text{ERROR } 922(n-1) \qquad \text{Equation 11}$$

The output 923 of Accumulator 912 is then coupled through a gain 917. The output value of gain 917 is the Recovered Time 916 that corresponds to the received CMTS time stamp. The Recovered Time 916 is then coupled into summation block 904 where it is subtracted from the received CMTS time stamp 902 to create an error representation 920. The error 920, representing the difference between the CMTS time 902 and the recovered time 916, is coupled into a first gain stage 906 which has a gain G1. The gain stage 906 multiplies the error 920 by a suitable constant G1 and couples an output value representing the phase difference between the recovered time and the CMTS time. The output value of the gain stage 906 is then coupled through a switch S1 918 into a summation block 910. The error 920 is also coupled into a second gain stage 908, which then multiplies it by a gain G2 and couples an output value into accumulator 914. The accumulator 914 accumulates the output value provided to it by the second gain stage 908 as shown in equation 12 where Fhat(n) represents the current value of the output of Accumulator 914.

$$Fhat(n)=Fhat(n-1)+ERROR(n)*G2 \qquad \text{Equation 12}$$

The output of the accumulator 914 (Fhat(n)), which represents an integration of the error over time i.e. a frequency difference, is then is coupled into summation block 910 where it is added to both the output of amplifier 906 and the center frequency to produce the current value of the ERROR 922 signal. The center frequency is a user supplied constant that allows the loop to center itself rapidly and is related to the frequency of the local clock.

Once the current value of ERROR 922 has been computed between the current value of RST and the received CMTS time stamp, the loop must examine the current value of ERROR 920 to determine if the SPLL is synchronized to the CMTS. To make this determination, the firmware compares the current value of ERROR 922 to a user supplied lock threshold value. If the current absolute value of ERROR 922 exceeds this value then the SPLL will make the determination that it is not locked and will set the OK to Transmit flag to FALSE, thus disallowing upstream transmissions. If the current absolute value of ERROR 922 is less than or equal to the value of the user supplied lock threshold then the SPLL will make the determination that it is synchronized to the CMTS and will set the OK to Transmit flag to true, thus allowing upstream transmissions. Note that other more sophisticated techniques are also possible to determine if the SPLL such as if the phase error of the CM (CMTS time stamp 902—Recovered System Time 916) is less than a given user defined threshold U for Y times in a row then the SPLL is declared "in lock," and the CM may begin transmitting frames upstream. Since in the present embodiment this is done in firmware, the variables U and Y may be flexibly chosen. Also, if the CM is locked and the phase error of the system is greater than or equal to a given threshold X for V times in a row then the CM is declared "out of lock." Since this is done in firmware, the variables X and V may also be flexibly chosen. If the system is declared to be in lock then the signal OK to Transmit Upstream is set to true and upstream transmissions are enabled.

Equations 13a, 13b, and 13c are formulas which may be used to compute the Recovered System Time for a each received SYNC message. ET(n) is the elapsed time between two received SYNC messages, and n represents the time when the n'th sync message was received.

$$RST(n) = \qquad \text{Equation 13a}$$
$$(G1\_Output(n-1) + Accumulator912\, Output(n-1)*$$
$$ET(n) + Center\ Frequency)*G3$$

where RT(n) represents the recovered time at time equals (n), G1_Output(n−1) is the output of the gain stage 906 at time (n−1), and accumulator output (n−1) is equal to the output of the accumulator 914. ET of (n) is the elapsed time at time (n) as described in Equation 4. RT of (n−1) is the recovered time at time equals to (n−1).

$$G1\_Output(n-1)=(ST(n-1)-RT(n-1))*G1 \qquad \text{Equation 13b}$$

where G1_Output of (n−1) is equal to the output of gain stage G1 906 at time (n−1). ST of (n−1) is equal to the actual CMTS system time at time (n−1). RT of (n−1) equals recovered system time at (n−1). ST(n−1) represents the previous time stamp that was received from the CMTS and used to update the SPLL. G3 represents the gain of gain stage 916 and G1 represents the gain of gain stage 906.

$$Accumulator\ Output\ 914(n-1) = \qquad \text{Equation 13c}$$
$$(ST(n-1)-RT(n-1))*G2+$$
$$Accumulator\ Output\ 914(n-2)$$

where the initial conditions at time 0 are:
G1_Output(0)=0,
Accumulator Output 914 (0)=0 and
RT(0)=ST(0).
Given that the SPLL is in lock, system time may be translated to a value of local time using Equation 14:

$$LT(N)=TT(N)*((LT(n)-LT(n-1))/(RT(n)-RT(n-1)))+LT \qquad \text{Equation 14}$$

where TT(N)=the transmission time at time N and LT(N)= the transformed value of local time corresponding to time N that is programmed into the upstream transmission circuitry. RT of (n) is the recovered time at time (n) and RT of (n−1) is the recovered time at time (n−1). LT(n) is the local hardware time as described by equation 3 at time (n) and LT (n−1) is the local hardware time at time n−1. The value of LT(N) may be programmed into the upstream transmission time register UTTR in order to send a packet upstream at the correct time N.

Figure 9D:
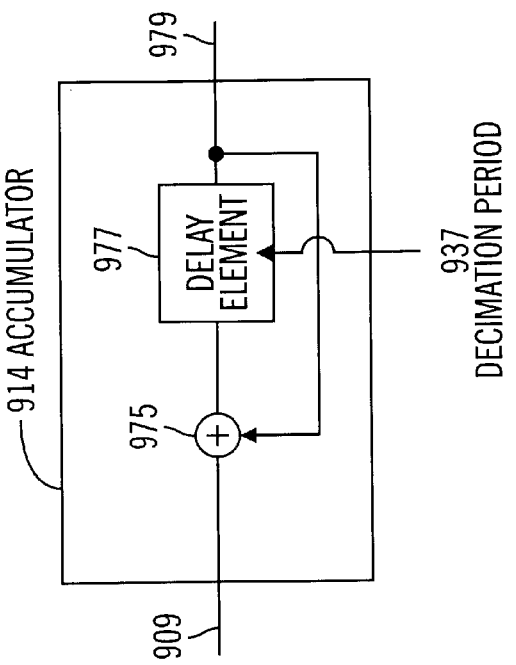
FIG. 9d is a more detailed block diagram illustrating accumulator 914 shown in FIG. 9b.
Figure 9C:
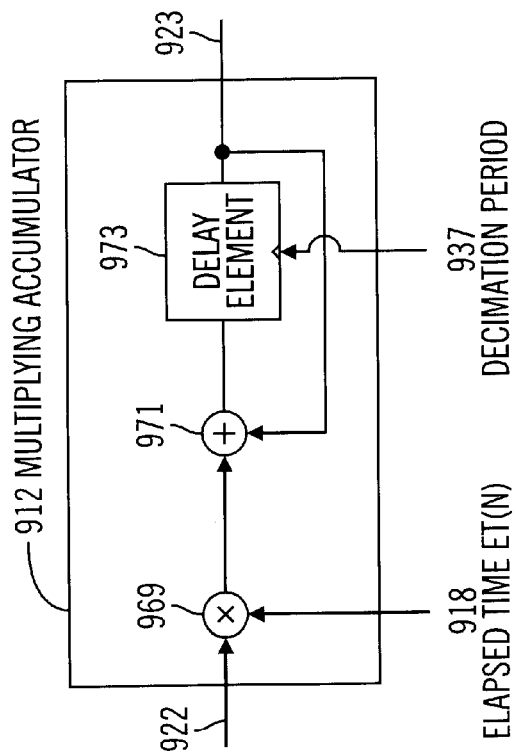
FIG. 9c is a more detailed block diagram of the multiplying accumulator 912 illustrated in FIG. 9b.

FIG. 9c is a detailed block diagram illustrating the components of the multiplying accumulator 912 of FIG. 9b. The ERROR signal 922 is coupled into multiplying accumulator 912 where it is multiplied by the Elapsed Time (n) in a multiplier 969. The output of the multiplier 969 is then coupled into an adder 971. The output of the adder is coupled into a delay element 973 whose delay is controlled by input 937 the decimation period. The output of the delay element 973 is taken as an output of the multiplying accumulator 912. The output of the delay element 973 is also fed back to the adder 971 where it is added to the output of multiplier 969 and coupled into the input of delay element 973.

FIG. 9d is a more detailed block diagram of accumulator 914. The output of gain stage G2 908 is signal 909. Signal 909 is coupled as an input into the accumulator 914. 909 is then coupled into an adder 975 within the accumulator 914. The output of adder 975 is coupled into a delay element 977 whose delay is controlled by the decimation period 937. The output of the delay element 977 comprises the output of the accumulator 979 also denoted as Fhat. The output of delay element 977 is also fed back and coupled into adder 975.

Figure 9E:
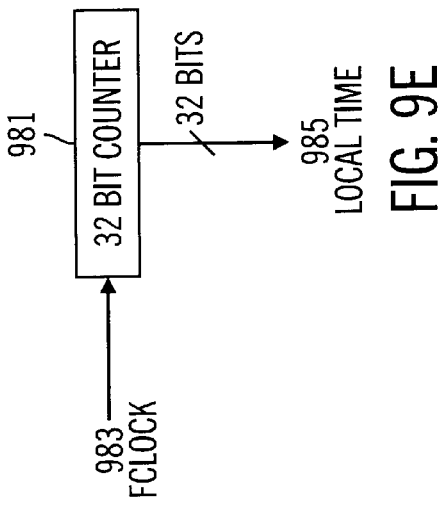
FIG. 9e is a block diagram illustrating the local time generator used with embodiments of the present invention.

FIG. 9e illustrates the implementation of a local clock within the present embodiment. 981 is a 32 bit counter whose output 32 bits 985 comprises the local time which is used by the system in generating time stamps. The 32 bit counter is clocked by Fclock 983 which is a local frequency generator within the system. Other embodiments may use various frequencies of Fclock 983 and various length bit counters 981 in order to satisfy the requirements of a particular implementation.

DVB Embodiment

The generalized DVB cable system is similar in topology and frequency allocation to the MCNS system illustrated in FIG. 2. The in band (IB) method of transferring data within the DVB system also utilizes an FDMA downstream (DS) broadcast. The in band (IB) method of transferring data within the DVB system also utilizes MPEG-2 Transport Stream Frames (as illustrated in FIG. 4). The in band (IB) method of transferring data within the DVB system also utilizes FDMA and TDMA (time division multiple access) for upstream (US) transmission to the head end illustrated in FIG. 2. In the DVB system there are no system time stamps transmitted downstream, in contrast to the MCNS system which transmits CMTS time stamps containing the CMTS system time downstream. Instead, information on the beginning of 3 millisecond periods is transmitted. In a DVB system the time to transmit the upstream burst is not provided by the Head End (HE) in terms of a system clock time as is the case with the MCNS system, instead a number of a Slot To Transmit (STT) is provided.

Figure 10A:
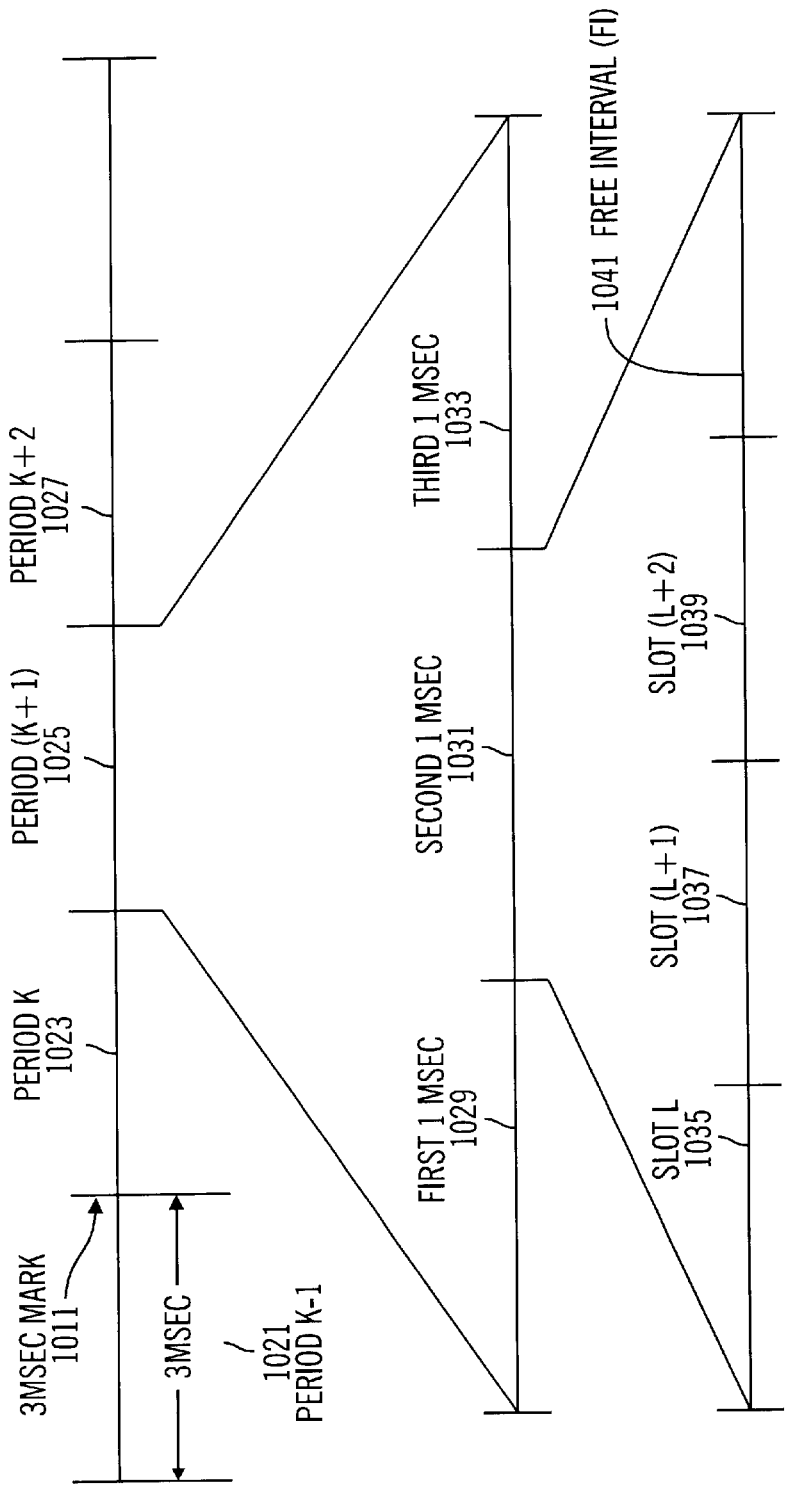
FIG. 10a is a graphical representation of the upstream broadcast timing using the Digital Video Broadcasting (DVB) standard.

FIG. 10a is a graphical representation of the timing defined for upstream transmission in a DVB system. The upstream broadcast time continuum is divided into sequential, successive 3 millisecond periods, e.g. 1021, 1023, 1025 and 1027. Each 3-millisecond period is further divided into 3 one-millisecond periods e.g. 1029, 1031, and 1033. Each one millisecond period is further divided into transmission slots and free time e.g. 1035, 1037, and 1039 free intervals (FI) e.g. 1041. The number of slots per one millisecond period (m) and the number of bits in the FI are determined by the bit rate of the upstream (US) channel. The exemplary bit rate in the DVB system illustrated in FIG. 10a is 1.544 Megabits/sec. In the case of an upstream broadcast rate of 1.544 Megabits/sec, the number of slots per one millisecond period, m, is equal to 3 and the FI is 8 bits. By doubling the upstream broadcast rate to 3.088 Megabits/sec., the number of slots per millisecond period is doubled to 6. By doubling the bit rate of 3.088 Megabits/sec to 6176 Megabits/sec. the number of slots, m, once again doubles to 12 and the FI increases to 32 bits. Each slot, e.g. 1035, 1037 or 1039 is 64 bytes long regardless of the transmission rate. Each 3 millisecond period e.g. 1021, 1023, 1025 and 1027 is assigned a 10 bit unsigned integer sequential serial number by the INA known as the Upstream Slot Position Register (USPR). Transmissions slots are also numbered sequentially, and start from 0 as do the 3 millisecond periods. If there are 9 slots per 3 millisecond period as illustrated in FIG. 10a 3 millisecond period 0 contains slots 0 through 8, 3 millisecond period 1 contains slots 9 through 17, transmission period 2 contains slots 18 through 26 etc. The first slot number in a 3 millisecond period whose serial number can be calculated based on this USPR by equation 15

$$\text{First slot\#} = USPR*3*m \qquad \text{Equation 15}$$

Each consecutive slot number is calculated by adding one to the number of the previous slot. So if there are 9 slots per period (as illustrated in FIG. 10a) and the 3 millisecond period number is 5 then the first slot in period 5 is numbered 45 (i.e. Slot#=USPR * m * 3=5 * 3 * 3), and the remaining slots are sequentially numbered 46 through 53. An INA can assign specific transmission slot to a particular NIU by indicating to the NIU the number of the Slot to Transmit (STT), which is to be used by the NIU for upstream transmission.

The slot number which has been assigned to a NIU for upstream transmission can be converted into a Upstream Time to Transmit (UTT) if we have: the time of the beginning of the 3 millisecond periods, the number of slots within a 3 millisecond period, which is 3 * m slots, the number of bytes per slot, which is fixed at 64 bytes in the DVB system, the number of bytes per Free Interval (e.g. 1041) which is m/3 bytes, the USPR and STT.

Figure 10B:
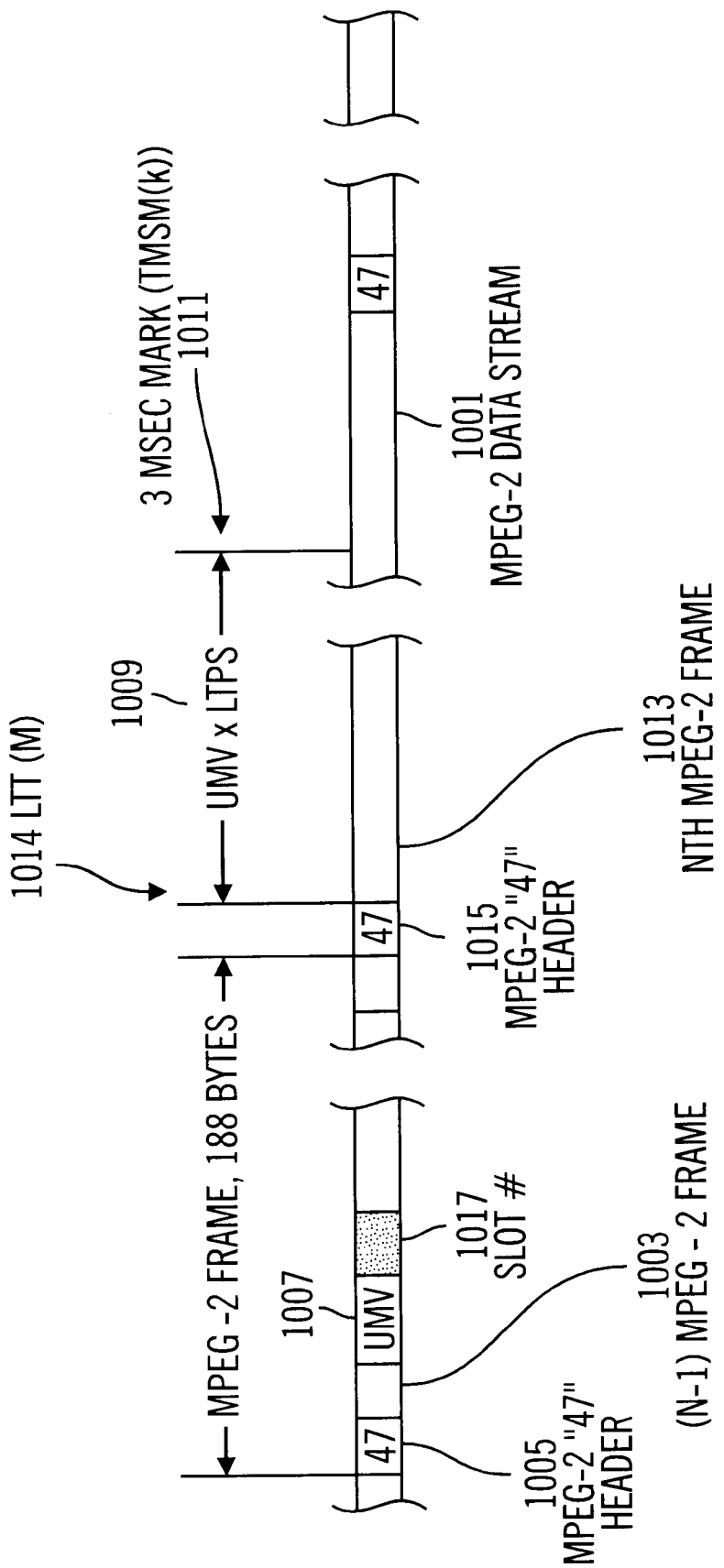
FIG. 10b is a graphic representation of the timing and synchronization information which is conveyed from an Interface Network Adapter (INA) to the Network Interface Unit (NIU) in a cable system utilizing the Digital Video Broadcasting (DVB) standard.

FIG. 10b is a graphical representation of the timing and synchronization information which is conveyed from an INA to NIUs within the downstream transmission of a MPEG-2 Data Stream 1001. 1001 represents an MPEG-2 stream comprising successive MPEG-2 frames 1003, 1013 etc. Each MPEG-2 frame comprises 188 bytes of data. MPEG-2 frame number 1003 is a special type of MPEG-2 frame known as a MAC (Media Access Control) control message frame. The MAC MPEG-2 frame 1003 is also referred to as a Sync frame if the synchronization information in the frame is enabled. The MAC message frame 1003 contains within it two numbers that are used for synchronization of upstream transmissions. The first number is the 10 bits USPR (UpStream Pointer Register)1017 and is used to identify to the NIU the 3 millisecond period serial #. The USPR number contained in the SYNC message is also referred to as the Upstream Marker Value (UMV)1007. The UMV is a 16-bit symbol pointer. The 16-bit symbol pointer provides a displacement in symbols between the start of the next MPEG-2 frame 1013 after the MAC SYNC message 1003 and the beginning of 3-millisecond period. Each frame within the MPEG-2 data stream 1001 is comprised of symbols. Symbols are groups of bits representing discrete amounts of information. The number of bits, which a symbol may represent, is different for different types of modulation. For example, QPSK (quadrature phase shift keying) comprises 2 bits per symbol. 16-QAM comprises 4 bits per symbol.

To determine the start of the 3 millisecond mark (TMSM (k) 1011, the NIU will count symbols from the MPEG-2 Header value 47 1015 that marks the beginning of the MPEG-2 frame 1013 the next MPEG-2 frame following the MAC SYNC message 1003. The 3 millisecond mark (TMSM(k) 1011 begins UMVsymbols from the end of the header 1015 which marks the beginning of the MPEG-2 frame 1013 following the MAC message SYNC frame 1003.

The components of the DVB embodiment are similar to those of the MCNS embodiment described previously in reference to FIG. 7. Blocks 760, 772, 762, 768, 770, 774 and 766 can be identical for both MCNS and DVB embodiments with appropriate changes in the computer program included in block 764 and in the Memory contents associated with block 762. All calculations used in the DVB embodiments described are performed in terms of local (NIU) time values, as there is no system time provided as in the MCNS case.

A first DVB embodiment incorporating the In Band (IB) method is described below: When each MPEG-2 frame arrives at the NIU its time of arrival is saved just as with the MCNS embodiment illustrated in FIG. 4. LTT(n) represents the Local Time Tag containing the arrival time of the first byte of the nth frame. In the DVB case n designates the serial number of the MPEG 2 frame 1013 that arrives immediately after SYNC message frame 1003.

To obtain timing information on the arrival rate of symbols the difference in arrival times of a sequence of x MPEG-2 frames is noted. The value for x is user programmable averaging value and can be adjusted depending on implementation requirements. LTT(n)–LTT(n–x) is the difference in local time of the arrival of the $(n-x)^{th}$ and nth MPEG 2 frames.

BPS represents the number of Bits Per Symbol in the downstream transmission. The number of Bits per symbol is fixed by the type of QAM modulation that is used to convey the downstream data to the NIU.

UMV(USPR) represents the number of symbols between the "47" MPEG-2 header and the beginning of the 3 millisecond mark TMSM(k) 1011 that marks the beginning of USPR 3 millisecond period. (In the MCNS embodiment a similar value N is used to describe the system time offset in bytes from the "47" MPEG-2 header of the sync message).

LTPS—The local time per downstream transmitted symbol 1009 is given by Equation 16.

$$LTPS=(((LTT(n)-LTT(n-x))/x)/(188*8))*BPS \quad \text{Equation 16}$$

(LTT(n)–LTT(n–x)) represents the time of arrival of the $(n)^{th}$ MPEG-2 frame minus the time of arrival of the $(n-x)^{th}$ MPEG-2 frame and so represents the time that it takes for x MPEG-2 frames to arrive. By dividing by x the expression {(LTT(n)–LTT(n–x))/x}results, which is the time that it takes for one MPEG-2 frame to arrive. Since each MPEG-2 frame comprises 188 bytes and each byte contains 8 bits by further dividing the time it take one MPEG-2 frame to arrive by 188*8 expression {(LTT(n)–LTT(n–x))/x}/(188*8) results which is the average time it takes for each bit to arrive. By multiplying the expression {(LTT(n)–LTT(n–x))/x}/(188*8) which is the time it takes for each bit to arrive, by BPS the (number of bits per symbol) the time per symbol i.e. LTPS of equation 16 results.

Those skilled in the art will recognize that other values such as 204 bytes per frame may be used in the above calculation for instance where pre Forward Error Correction symbol time is desired.

The local time of the 3 millisecond mark 1011 TMSM (UMV) for UMV=k symbols is obtained by multiplying the LTPS (Local Time Per Symbol) by the UMV and adding LTT(n) 1014, as illustrated in FIG. 10b.

$$TMSM(k)=UMV*LTPS+LTT(n) \quad \text{Equation 17}$$

By substituting the value for LTPS from equation 16 into equation 17, equation 18 below results $$TMSM(k)=UMV*(LTT(n)-LTT(n-y))*BPS/(188*8*y)+LTT(n) \quad \text{Equation 18}$$

Equation 18, if calculated in the order from left to right is the preferred way to calculate TMSM(k). By calculating in the order from left to right rounding errors that could occur if division is made before the multiplication can be avoided, of course care should be taken not to overflow in the fixed point multiplication.

A TMSM value could be calculated for each beginning of 3 millisecond period or a decimation factor y could be used and the calculation could be carried out every y number of 3 millisecond periods.

In the exemplary embodiments described it should be noted that LTT(n) is a tagged value of a free running 32 bit counter and so the wrap around phenomena might need to be addressed.

The value of consecutive calculated TMSMs could be saved in memory to allow linear interpolation and extrapolation calculations of expected TMSM values. For example if TMSM(ky) and TMSM(k–y) were calculated, a linear extrapolation to calculate the expected value of TMSMexpected at time (k+z) would be:

$$TMSMexpected(k+z)=TMSM(k)+((TMSM(k)-TMSM(k-y))/y)*z \quad \text{Equation 19}$$

((TMSM(k)–TMSM(k–y))/y) represents the average time per symbol. If z=y is chosen TMSMexpected(k+y) can be calculated. This expected value is subtracted from the actual value of TMSM(k+y) to yield an estimation of a synchronization error. If the synchronization error is less than a programmable threshold, an OK to Transmit flag can be asserted indicating that the synchronization error is small enough to proceed to transmit. If the synchronization error is less than a programmable threshold, the OK to Transmit flag can be de-asserted indicating that synchronization has been lost and upstream transmission can then be stopped.

Although the MCNS and the DVB protocols provide synchronization information differently the above calculations require similar initialization and update function stages as illustrated in FIG. 8 for the MCNS protocol described previously.

Linear extrapolation can be applied for the calculation of the Upstream Time to Transmit, UTT. The UTT value thus calculated can then be provided to 770 UTTR register of FIG. 7.

When a MAC control message arrives at an NIU carrying information on the number of Slot To Transmit (STT), the corresponding 3 millisecond period number USPRTT (Upstream Slot Position Register to Transmit) can be calculated:

$$USPRTT=STT/(3*m) \quad \text{Equation 20}$$

Note that USPRTT is a whole number so any fractional component that would result in equation 20 is dropped in the computation of USPRTT. The number of 3 millisecond periods from the last calculated 3 millisecond mark TMSM (k) to the beginning of USPRTT 3 millisecond period is calculated by subtracting k from USPRTT The subtraction would take into consideration the rollover to 0 after the maximum value of USPR were reached as provided by the DVB specification. We can insert this value in the parameter z of equation 19 to get the TMSMexpected(USPRTT) which is the expected local time of the beginning of the corresponding 3 millisecond period where the allotted transmission slot resides.

The number of slots SOFF (slot offset) from the beginning of the corresponding 3 millisecond period to the beginning of STT can be calculated using equation 21.

$$SOFF=STT \bmod (3*m) \quad \text{Equation 21}$$

Where mod is the modulo operation. The value for SOFF can be an integer value in the range of zero to 3*m–-1. In DVB the SOFF value is commonly provided by the INA so it need not be calculated. Each slot, e.g. 1035 in FIG. 10a, is 64 bytes long, and there are m slots per 1 millisecond subperiod, e.g. 1025 in FIG. 10a, and m/3 bytes of free interval (FI), e.g. 1041 in FIG. 10a. Since m is the number of slots in a 1 millisecond subperiod, e.g. 1031 in FIG. 10a, and m/3 is the number of bytes in the Free Interval (FI), e.g. 1041 in FIG. 10a, the number of BPTMS (Bytes Per Three MilliSecond) is given by equation 22:

$$BPTMS=3*(64*m+m/3)=193*m. \quad \text{Equation 22}$$

Thus each 1 millisecond sub period, e.g. 1031 of FIG. 10a, is 64*m+m/3 bytes long and number of bytes BOFF (byte offset) from the beginning of the corresponding 3 millisecond period to the beginning of the STT is derived from SOFF as follows:

If $(SOFF<m)$ then $BOFF=SOFF*64$.     Equation 23

If $(m-1<SOFF<2*m)$ then $BOFF=SOFF*64+m/3$     Equation 24

If $(2*m-1<SOFF<3*m)$ then $BOFF=SOFF*64+2*m/3$     Equation 25

Since (TMSM(k)−TMSM(k−y)) represents the time between y three millisecond marks, (TMSM(k)−TMSM(k−y))/y is the average time of one 3 millisecond mark (in terms of local clock time). Because within each three millisecond period there are 193*m bytes (from Equation 22) the Local Time Per Byte (LTPB) is given in equation 26:

$LTPB=((TMSM(k)-TMSM(k-y))/y)/BPTMS$     Equation 26

By substituting in the value for BPTMS from equation 22, equation 27 results:

$LTPB=(TMSM(k)-TMSM(k-y))/(y*193*m)$     Equation 27

The ranging process for systems using the DVB protocol is similar as those systems using the MCNS protocol. The result of the ranging process is a fixed Ranging Delay RD, which may be positive or negative in units of local time. The Ranging Delay RD is used to compensate for fixed delays associated with each individual NIU. Absolute units of delay, for example in milliseconds can be translated to a local time value by using local time per three millisecond period.

UTT (Upstream Time to Transmit), which is the value that will be placed in the UTTR (Upstream Time to Transmit Register) 770 of FIG. 7 is the expected time of the beginning of the corresponding 3 millisecond period plus the byte offset BOFF times the Local Time Per Byte LTPB plus the Ranging delay described above, as indicated in equation 28 below:

$UTT=TMSMexpected(USPRTT)+LTPB*BOFF+RD$     Equation 28

Substituting in the value for LTPB from equation 27 we get equation 29.

$$UTT = (TMSM(k) - TMSM(k-y)) * BOFF / (y*193*m) + TMSexpected(USPRTT) + RD$$     Equation 29

A second DVB embodiment is based on the MCNS embodiment illustrated in FIGS. 9a and 9b. For this second DVB embodiment TMSM(k) (the local time of the 3 millisecond mark) is calculated the same way as in the first DVB embodiment using equation 18. The value for TMSM(k) becomes the Head End timing input 902 as illustrated in FIG. 9B.

The OK to transmit flag 953 of FIG. 9b is generated by comparing an error 920 with a implementation dependant user defined threshold 935 just as in the MCNS embodiment. The Recovered Time RT(k) 916 in the DVB embodiment is the local time of the 3 millisecond mark.

Decimation techniques can be applied by selecting a proper y for the SPLL.

Recovered Time RT(i) 916 represents the TMSM(i) values. By substituting the Recovered time RT(i) 916 values for TMSM(i) values using the equations (19, 26, 27, 28 and 29) the present embodiment can calculate the Upstream Time to Transmit UTT, which can then be inserted into the Upstream Time to Transmit Register 770 as illustrated in FIG. 7.

In the DVB Out Of Band (OOB) protocol the frames transmitted downstream are not MPEG-2 frames but ESF of 4632 bits per frame. If the bit rate of the downstream transmission is 1.544 Mbits/sec. the duration of 1 ESF is 3 milliseconds. In an OOB embodiment of the invention the first bit of the ESF would be tagged by the time tag generator 772 and the local time tagged is the TMSM value to be used. For a downstream bit rate of 3.088 Mbits/sec. two ESF will fit into a 3 millisecond period. It is possible to identify the first of each pair of ESFs and the first bit of this ESF is tagged as the TMSM. All other calculations remain the same as the first and second DVB embodiments described above.

Another aspect of the MCNS and DVB embodiments is that units which may utilize either protocol may be produced and then programmed to use either protocol by changing the firmware within the unit (either NIU or CM). A still further aspect of the invention is that the illustrated concepts can be used to synchronize transmission with outside clocks or events thereby giving designers a flexible and useful method for future applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A network interface apparatus for providing data transmissions to a network controller that are synchronized with transmissions from other network interface apparatuses to the network controller, the apparatus comprising:

a clock from which the network interface unit obtains a local time;

a message receiver for receiving messages from the network controller;

a time tag generator for recording local times of arrival of synchronizing messages at the interface unit, the synchronizing messages containing synchronizing information comprising an offset from the beginning of a received frame marker and a number of a transmit slot relative to the offset in which to transmit;

a phase lock loop for accepting time tag information and synchronizing information corresponding to synchronizing messages and generating corresponding local transmit time information therefrom; and a transmission unit for generating data transmissions from the network interface unit to the network control unit in accordance with said local transmit time information.

2. An apparatus as claimed in claim 1 wherein the network interface unit operates according to a DVB protocol.

3. An apparatus as claimed in claim 1 wherein the phase lock loop is a software phase lock loop.

4. An apparatus as claimed in claim 1 wherein the phase lock loop accepts a center frequency for biasing the phase lock loop towards an operating frequency.

5. An apparatus as claimed in claim 1 wherein the phase lock loop accepts a decimation period and samples synchronizing information in accordance with the decimation period.

6. An apparatus as claimed in claim 5 wherein the decimation period corresponds to the arrival of synchronizing messages.

7. An apparatus as claimed in claim 1, wherein the phase lock loop further accepts phase adjustment information from ranging phase adjustment messages and generates local transmit time information from time tag information and synchronizing information and said phase adjustment information.

8. An apparatus as claimed in claim 7, wherein said phase adjustment information comprises a measure of a fixed transmission delay between the network interface apparatus and the network controller.

9. An apparatus as claimed in claim 1, wherein said offset comprises a number of received symbols.

10. A method in a network interface unit for synchronizing data transmissions from multiple network interface units to a network controller, the method comprising:

receiving synchronizing information from the network controller comprising an offset from the beginning of a received frame marker and a number of a transmit slot relative to the offset in which to transmit;

receiving phase adjustment information from a ranging phase adjustment message;

recording a local time of arrival of the synchronizing information at the interface unit;

determining local transmit time information for transmission to the network controller in accordance with said offset, said transmit slot number, said local time of arrival and said phase adjustment information; and transmitting data to the network controller in accordance with said local transmit time information.

11. A method as claimed in claim 10 wherein receiving synchronizing information from the network controller comprises:

receiving a synchronizing message from the network controller;

placing the synchronizing message into memory; and extracting an offset and a number of a transmit slot relative to the offset from the synchronizing message.

12. A method as claimed in claim 10, wherein said phase adjustment information comprises a measure of a fixed transmission delay between the network interface apparatus and the network controller.

13. A method as claimed in claim 10, wherein said offset comprises a number of received symbols.

14. A network interface apparatus for providing data transmissions to a network controller that are synchronized with transmissions from other network interface apparatuses to the network controller, the apparatus comprising:

at least one processor; and computer readable media coupled to the at least one processor and containing programming instructions for performing processing comprising:

receiving synchronizing information from the network controller comprising an offset from the beginning of a received frame marker and a number of a transmit slot relative to the offset in which to transmit;

receiving phase adjustment information from a ranging phase adjustment message;

recording a local time of arrival of the synchronizing information at the interface unit;

determining local transmit time information for transmission to the network controller in accordance with said offset, said transmit slot number, said local time of arrival and said phase adjustment information; and transmitting data to the network controller in accordance with said local transmit time information.

15. A network interface apparatus as claimed in claim 14, wherein receiving synchronizing information from the network controller comprises:

receiving a synchronizing message from the network controller;

placing the synchronizing message into memory; and extracting an offset and a number of a transmit slot relative to the offset from the synchronizing message.

16. A network interface apparatus as claimed in claim 14, wherein said phase adjustment information comprises a measure of a fixed transmission delay between the network interface apparatus and the network controller.

17. A network interface apparatus as claimed in claim 15, wherein said offset comprises a number of received symbols.

* * * * *